United States Patent
Cui et al.

(10) Patent No.: US 12,294,787 B2
(45) Date of Patent: May 6, 2025

(54) VIDEO PROCESSING METHOD AND APPARATUS, ELECTRONIC DEVICE, AND STORAGE MEDIUM

(71) Applicant: HONOR DEVICE CO., LTD., Shenzhen (CN)

(72) Inventors: Hantao Cui, Shenzhen (CN); Jirun Xu, Shenzhen (CN); Bin Chen, Shenzhen (CN); Xiaochao Ren, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/275,311

(22) PCT Filed: May 24, 2022

(86) PCT No.: PCT/CN2022/094781
§ 371 (c)(1),
(2) Date: Aug. 1, 2023

(87) PCT Pub. No.: WO2023/016043
PCT Pub. Date: Feb. 16, 2023

(65) Prior Publication Data
US 2024/0187744 A1  Jun. 6, 2024

(30) Foreign Application Priority Data

Aug. 12, 2021 (CN) .......................... 202110926901.3

(51) Int. Cl.
*H04N 23/667* (2023.01)
*H04N 23/617* (2023.01)
*H04N 23/71* (2023.01)
*H04N 23/741* (2023.01)
*H04N 23/81* (2023.01)

(52) U.S. Cl.
CPC .......... *H04N 23/81* (2023.01); *H04N 23/617* (2023.01); *H04N 23/667* (2023.01); *H04N 23/71* (2023.01); *H04N 23/741* (2023.01)

(58) Field of Classification Search
CPC .... H04N 23/617; H04N 23/667; H04N 23/70; H04N 23/71; H04N 23/73; H04N 23/741; H04N 23/81
See application file for complete search history.

(56) References Cited

U.S. PATENT DOCUMENTS

| 11,089,207 | B2 | 8/2021 | Wang |
| 2009/0303343 | A1 | 12/2009 | Drimbarean |

(Continued)

FOREIGN PATENT DOCUMENTS

| CN | 105763814 A | 7/2016 |
| CN | 109005366 A | 12/2018 |

(Continued)

OTHER PUBLICATIONS

Harald Brendel;"Alexa Log C Curve Usage in VFX"; Mar. 9, 2017; pp. 1-10; Retrieved from the internet, URL: https://www.arri.com/resource/blob/31918/66f56e6abb6e5b6553929edf9aa7483e/2017-03-alexa-logc-curve-in-vfx-data.pdf.

*Primary Examiner* — Daniel M Pasiewicz
(74) *Attorney, Agent, or Firm* — WOMBLE BOND DICKINSON (US) LLP

(57) ABSTRACT

Embodiments of this application relate to the technical field of video shooting and provide a video processing method and apparatus, an electronic device, and a storage medium. The video processing method includes: in a first night mode or in a second night mode, obtaining a video shot through a camera lens; in the first night mode, processing a video image of a first exposure frame, where processing is used for reducing noise and increasing a luminance; in the first night mode, fusing a video image of a first exposure frame (Continued)

processed and the video image of a second exposure frame not processed, to obtain a fused video; and in the second night mode, fusing the video image of a first exposure frame and the video image of a second exposure frame, to obtain a fused video.

18 Claims, 12 Drawing Sheets

(56) References Cited

U.S. PATENT DOCUMENTS

| | | | |
|---|---|---|---|
| 2017/0034520 A1 | | 2/2017 | Rosewarne |
| 2021/0120164 A1* | | 4/2021 | Aokage ................ H04N 23/741 |

FOREIGN PATENT DOCUMENTS

| | | | |
|---|---|---|---|
| CN | 109618099 A | 4/2019 | |
| CN | 110113539 A | 8/2019 | |
| CN | 110121882 A | 8/2019 | |
| CN | 110166708 A | 8/2019 | |
| CN | 110266954 A | 9/2019 | |
| CN | 110611750 A | 12/2019 | |
| CN | 112437235 A | 3/2021 | |
| CN | 113824914 A | 12/2021 | |
| EP | 3624439 A2 | 3/2020 | |
| WO | 2020038069 A1 | 2/2020 | |
| WO | 2020057198 A1 | 3/2020 | |

* cited by examiner

VIDEO PROCESSING METHOD AND APPARATUS, ELECTRONIC DEVICE, AND STORAGE MEDIUM

CROSS-REFERECNE TO RELATED APPLICATIONS

This application is a national stage of International Application No. PCT/CN2022/094781, filed on May 24, 2022, which claims priority to Chinese Patent Application No. 202110926901.3, filed on Aug. 12, 2021. The disclosures of both of the aforementioned applications are hereby incorporated by reference in their entireties.

TECHNICAL FIELD

This application relates to the technical field of video shooting, and in particular to a video processing method and apparatus, an electronic device, and a storage medium.

BACKGROUND

With the development of technologies, users have increasingly high requirements for an effect of videos shot through terminals such as mobile phones. However, videos shot through current mobile phones have poor quality in a low-light night scene due to shooting limitation.

SUMMARY

A video processing method and apparatus, an electronic device, and a storage medium are provided, to improve quality of a video shot in a low-light night scene.

According to a first aspect, a video processing method is provided. The method includes: in a first night mode or a second night mode, obtaining a video shot through a camera lens, where the video includes a video image of a first exposure frame and a video image of a second exposure frame that are alternated, and a time for which the video image of a first exposure frame is exposed is greater than a time for which the video image of a second exposure frame is exposed; in the first night mode, processing the video image of a first exposure frame by using an artificial intelligence AI night algorithm, where processing by using the AI night algorithm is used for reducing noise and increasing a luminance; in the first night mode, fusing a video image of a first exposure frame processed by using the AI night algorithm and the video image of a second exposure frame not processed by using the AI night algorithm, to obtain a fused video, where the video image of a first exposure frame has a first weight; and in the second night mode, fusing the video image of a first exposure frame and the video image of a second exposure frame, to obtain a fused video, where the video image of a first exposure frame has a second weight, and the first weight is greater than the second weight.

In a possible implementation, the video processing method further includes: in the first night mode, processing the fused video by using a logarithm LOG curve corresponding to a current photosensitivity ISO of the camera lens, to obtain a LOG video; and processing the LOG video based on a look up table LUT, to obtain a video processed by using the LUT. During video recording, the LOG video is processed based on a LUT corresponding to a determined video style template or a LUT corresponding to the first night mode by using a LUT technology in a movie industry. This enables a recorded video to have a style effect corresponding to the determined video style template, or a color restoration effect of a skin color of a portrait to be improved, to meet a high color correction requirement.

In a possible implementation, the video processing method further includes: the processing the video image of a first exposure frame by using an AI night algorithm includes: obtaining statistical information corresponding to the video image of a first exposure frame; and using the statistical information and a RAW image of the video image of a first exposure frame as inputs to be processed by using the AI night algorithm, to obtain a processed RAW image of the video image of a first exposure frame.

In a possible implementation, the video processing method further includes: periodically obtaining a luminance of a current image in a video shot through the camera lens, and if the luminance is less than a first luminance threshold, displaying a first night mode, or if the luminance is greater than a second luminance threshold, displaying a second night mode. The first luminance threshold is less than the second luminance threshold.

In a possible implementation, the video processing method further includes: in the first night mode, obtaining a video in a manner of non-overlapping exposure; and in the second night mode, obtaining a video in a manner of overlapping exposure.

In a possible implementation, a process of processing the fused video by using a logarithm LOG curve corresponding to a current photosensitivity ISO of the camera lens, to obtain a LOG video, and a process of processing the LOG video based on a look up table LUT, to obtain a video processed by using the LUT are performed in a first video processing procedure. The video processing method further includes a second video processing procedure. The second video processing procedure includes: processing the fused video by using the logarithm LOG curve corresponding to the current photosensitivity ISO of the camera lens, to obtain a LOG video; and processing the LOG video based on a look up table LUT, to obtain a video processed by using the LUT. The video processing method further includes: storing the video processed by using the LUT in the first video processing procedure; and previewing the video processed by using the LUT in the second video processing procedure.

According to a second aspect, a video processing apparatus is provided. The video processing apparatus includes: a processor and a memory. The memory is configured to store at least one instruction. The instruction is loaded and executed by the processor to implement the foregoing video processing method.

According to a third aspect, an electronic device is provided. The electronic device includes: a camera lens and the foregoing video processing apparatus.

According to a fourth aspect, a computer-readable storage medium is provided. The computer-readable storage medium stores a computer program. When the computer program is run on a computer, the computer is enabled to perform the foregoing video processing method.

In the video processing method and apparatus, the electronic device, and the storage medium in embodiments of this application, the video shot through the camera lens includes the video image of a first exposure frame and the video image of a second exposure frame that are alternated. A time for which the video image of a first exposure frame is exposed is greater than a time for which the video image of a second exposure frame is exposed. In the first night mode, the video image of a first exposure frame processed by using the AI night algorithm and the video image of a second exposure frame not processed by using the AI night algorithm are fused. In the second night mode, the video image of a first exposure frame and the video image of a second exposure frame are fused. Compared with the second night mode, in the first night mode, the video image of a first exposure frame has a greater fusion weight. On the one hand, in the first night mode, only an image that is exposed for a long time is processed by using the IA night algorithm, reducing a time for which the image is processed, and on the other hand, compared with the second night mode, in the first night mode, a fusion weight of the image that is exposed for a long time is increased. This enables a fused image to more clearly reflect an effect of processing by using the AI night algorithm, improving quality of a video shot in a low-light night scene.

DESCRIPTION OF EMBODIMENTS

Terms used in implementations of this application are merely intended to explain specific embodiments of this application, but are not intended to limit this application.

Figure 1:
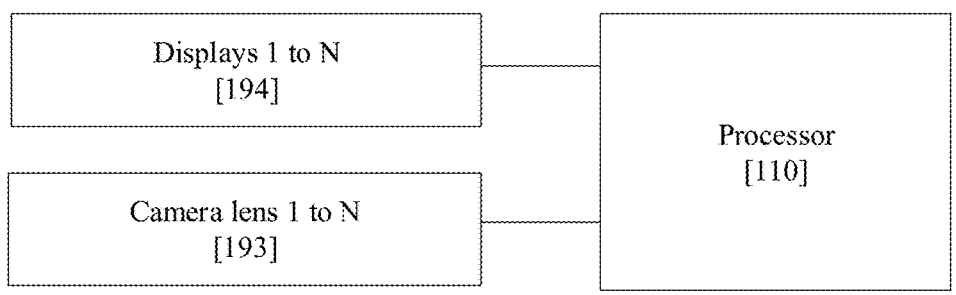
FIG. 1 is a block diagram of a structure of an electronic device according to an embodiment of this application.

Before introducing embodiments of this application, an electronic device in the embodiments of this application is first described. As shown in FIG. 1, the electronic device 100 may include a processor 110, camera lenses 193, displays 194, and the like. It may be understood that a structure shown in this embodiment of the present invention does not constitute a specific limitation on the electronic device 100. In some other embodiments of this application, the electronic device 100 may include more or fewer components than those shown in the figure, combine some components, split some components, or have a different component arrangement. The components shown in the figure may be implemented in hardware, software, or a combination of software and hardware.

The processor 110 may include one or more processing units. For example, the processor 110 may include a graph-ics processing unit (graphics processing unit, GPU), an image signal processor (image signal processor, ISP), a controller, a video codec, a digital signal processor (digital signal processor, DSP), and the like. Different processing units may be separate devices or may be integrated into one or more processors. The controller may generate an operation control signal based on instruction operation code and a time sequence signal, to complete control of instruction fetching and instruction execution. A memory may be further disposed in the processor 110 and is configured to store instructions and data.

The electronic device 100 implements a display function by using the GPU, the displays 194, an application processor, and the like. The GPU is a microprocessor for image processing and is connected to the displays 194 and the application processor. The GPU is configured to perform mathematical and geometric computation and render a graph. The processor 110 may include one or more GPUs and execute program instructions to generate or change display information.

The electronic device 100 can implement a shooting function by using the ISP, the camera lenses 193, the video codec, the GPU, the displays 194, the application processor, and the like.

The ISP is configured to process data fed back by the camera lens 193. For example, during shooting, a shutter is pressed, and light is transmitted to a photosensitive element of the camera lens through a lens. An optical signal is converted into an electrical signal, and the photosensitive element of the camera lens transmits the electrical signal to the ISP for processing, to convert the electrical signal into a visible image. The ISP may further perform algorithm optimization on noise, luminance, and complexion of the image. The ISP may further optimize parameters such as exposure and a color temperature of a shooting scene. In some embodiments, the ISP may be disposed in the camera lens 193.

The camera lens 193 is configured to capture a still image or a video. An optical image of an object is generated through the lens and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts the optical signal into the electrical signal and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N camera lenses 193, where N is a positive integer greater than 1.

The digital signal processor is configured to process a digital signal and may process another digital signal in addition to the digital image signal. For example, when the electronic device 100 selects a frequency, the digital signal processor is configured to perform Fourier transformation or the like on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG)1, MPEG2, MPEG3, and MPEG4.

Figure 2:
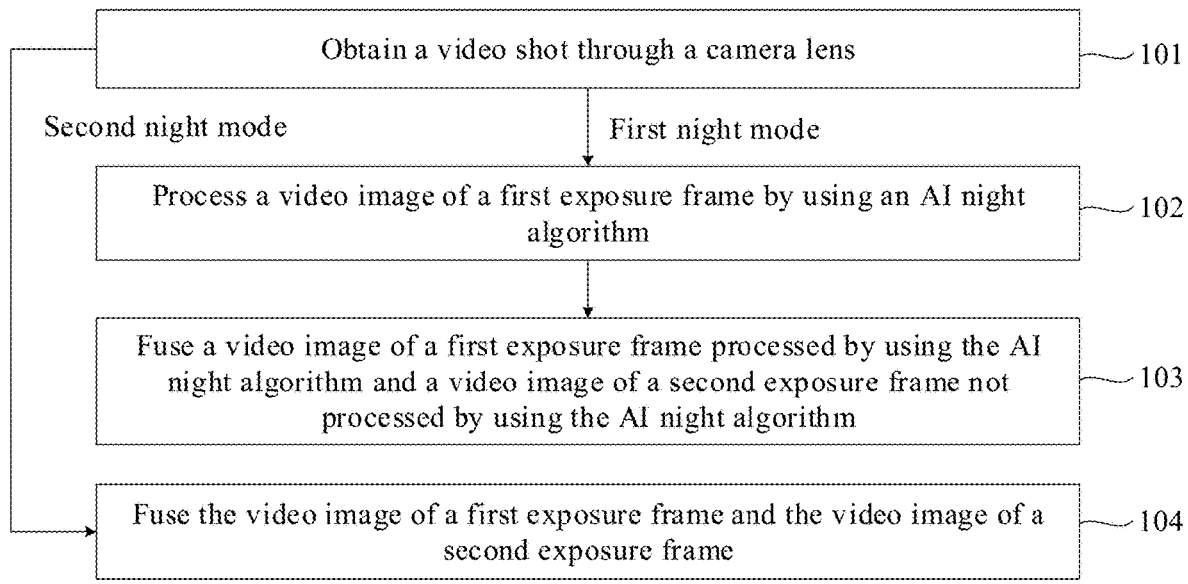
FIG. 2 is a flowchart of a video processing method according to an embodiment of this application.

As shown in FIG. 2, an embodiment of this application provides a video processing method. The video processing method may be performed by a processor 110, that is, an ISP or a combination of the ISP and another processor. The video processing method includes the following steps.

In a first night mode or a second night mode, step 101 is performed: obtaining a video shot through a camera lens. The video includes a video image of a first exposure frame and a video image of a second exposure frame that are alternated. A time for which the video image of a first exposure frame is exposed is greater than a time for which the video image of a second exposure frame is exposed.

The first night mode and the second night mode may be switched based on a user's selection or may be automatically determined and switched based on a current image of a video shot through the camera lens. While the camera lens is capturing the video, different exposure time is alternately used for capturing, so that video images based on the different exposure time are fused subsequently.

In the first night mode, step 102 is performed: processing the video image of a first exposure frame by using an artificial intelligence (Artificial Intelligence, AI) night algorithm. Processing by using the AI night algorithm is used for reducing noise and increasing a luminance, to implement detail restoration in a night scene.

The first night mode is a mode appropriate for recording a night video. In this mode, a video image is to be processed by using the AI night algorithm. In an electronic device, a camera lens captures a video image of a first exposure frame and a video image of a second exposure frame at a high frequency. Therefore, if the AI night algorithm is used for both the video image of a first exposure frame and the video image of a second exposure frame, a high frame rate requirement may not be met. Because other video images of a first exposure frame are exposed for a long time, have a large light intake, and are more appropriate for a night scene, in this embodiment of this application, one of the other video images of a first exposure frame is selected to be processed by using the AI night algorithm, and the video image of a second exposure frame is not processed by using the AI night algorithm. In this way, the video image of a first exposure frame that is more appropriate for the night scene is processed by using the AI night algorithm, so that application of the AI night algorithm may be implemented within a valid time.

In the first night mode, step 103 is performed: fusing a video image of a first exposure frame processed by using the AI night algorithm and the video image of a second exposure frame not processed by using the AI night algorithm, to obtain a fused video. The video image of a first exposure frame has a first weight.

During fusing of video images, every video image of a first exposure frame and every video image of a second exposure frame that are adjacent are fused into anew frame of video image. The fused video image includes information in the video image of a first exposure frame and information in the video image of a second exposure frame. Fusion weight of the two frames of images may be adjusted. The video image of a first exposure frame has the first weight, that is, a fusion weight occupied by the video image of a first exposure frame in two frames. As the first weight is larger, more information in the video image of a first exposure frame is included in the fused video image. Correspondingly, as a weight occupied by the video image of a second exposure frame is small, less information in the video image of a second frame is included in the fused video image.

In the second night mode, step 104 is performed: fusing the video image of a first exposure frame and the video image of a second exposure frame, to obtain a fused video. The video image of a first exposure frame has a second weight. The first weight is greater than the second weight.

Specifically, it is assumed that the first weight occupies 70% and the second weight occupies 50%, that is, in the second night mode, the video image of a first exposure frame and the video image of a second exposure frame are fused based on the first weight of 50% and the second weight of 50% respectively. A fused video image includes 50% of the information in the video image of a first exposure frame and 50% of the information in the video image of a second exposure frame. In the first night mode, the video image of a first exposure frame and the video image of a second exposure frame are fused based on 70% of a weight of the video image of a first exposure frame and 30% of a weight of the video image of a second exposure frame. A fused video image includes 70% of the information in the video image of a first exposure frame and 30% of the information in the video image of a second exposure frame. That is, compared with the second night mode, in the first night mode, the video image of a first exposure frame has a greater fusion weight. In this way, an effect of processing by using the AI night algorithm may be more clearly reflected in the fused video image on the premise that the video image of a second exposure frame is not processed by using the AI night algorithm. For a fused video, a related video processing process may be continually performed to complete video recording.

In the video processing method in this embodiment of this application, the video shot through the camera lens includes the video image of a first exposure frame and the video image of a second exposure frame that are alternated. A time for which the video image of a first exposure frame is exposed is greater than a time for which the video image of a second exposure frame is exposed. In the first night mode, the video image of a first exposure frame processed by using the AI night algorithm and the video image of a second exposure frame not processed by using the AI night algorithm are fused. In the second night mode, the video image of a first exposure frame and the video image of a second exposure frame are fused. Compared with the second night mode, in the first night mode, the video image of a first exposure frame has a greater fusion weight. On the one hand, in the first night mode, only an image that is exposed for a long time is processed by using the IA night algorithm, reducing a time for which the image is processed, and on the other hand, compared with the second night mode, in the first night mode, a fusion weight of the image that is exposed for a long time is increased. This enables a fused image to more clearly reflect an effect of processing by using the AI night algorithm, improving quality of a video shot in a low-light night scene.

Figure 3:
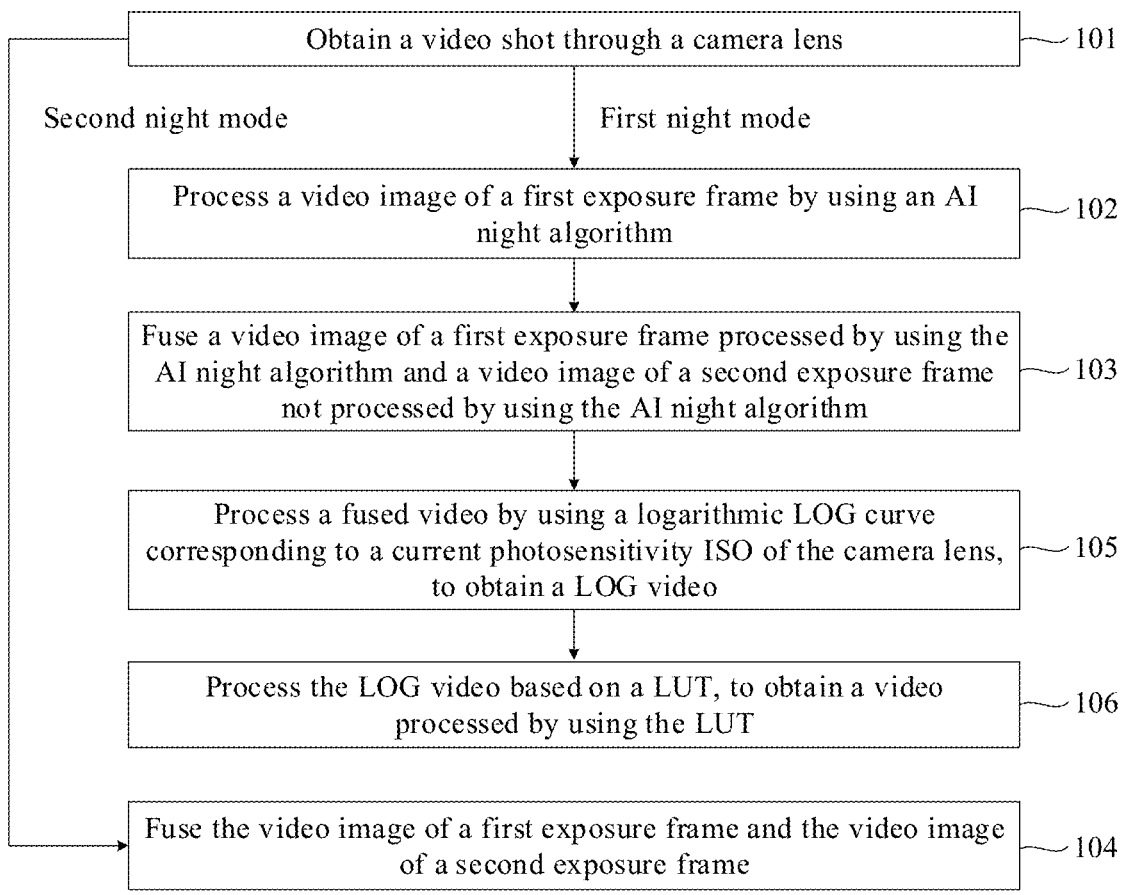
FIG. 3 is a flowchart of another video processing method according to an embodiment of this application.

In a possible implementation, as shown in FIG. 3, the video processing method further includes the following steps.

In the first night mode, step 105 is performed: processing a fused video by using a logarithm LOG curve corresponding to a current photosensitivity ISO of the camera lens, to obtain a LOG video.

Figure 4:
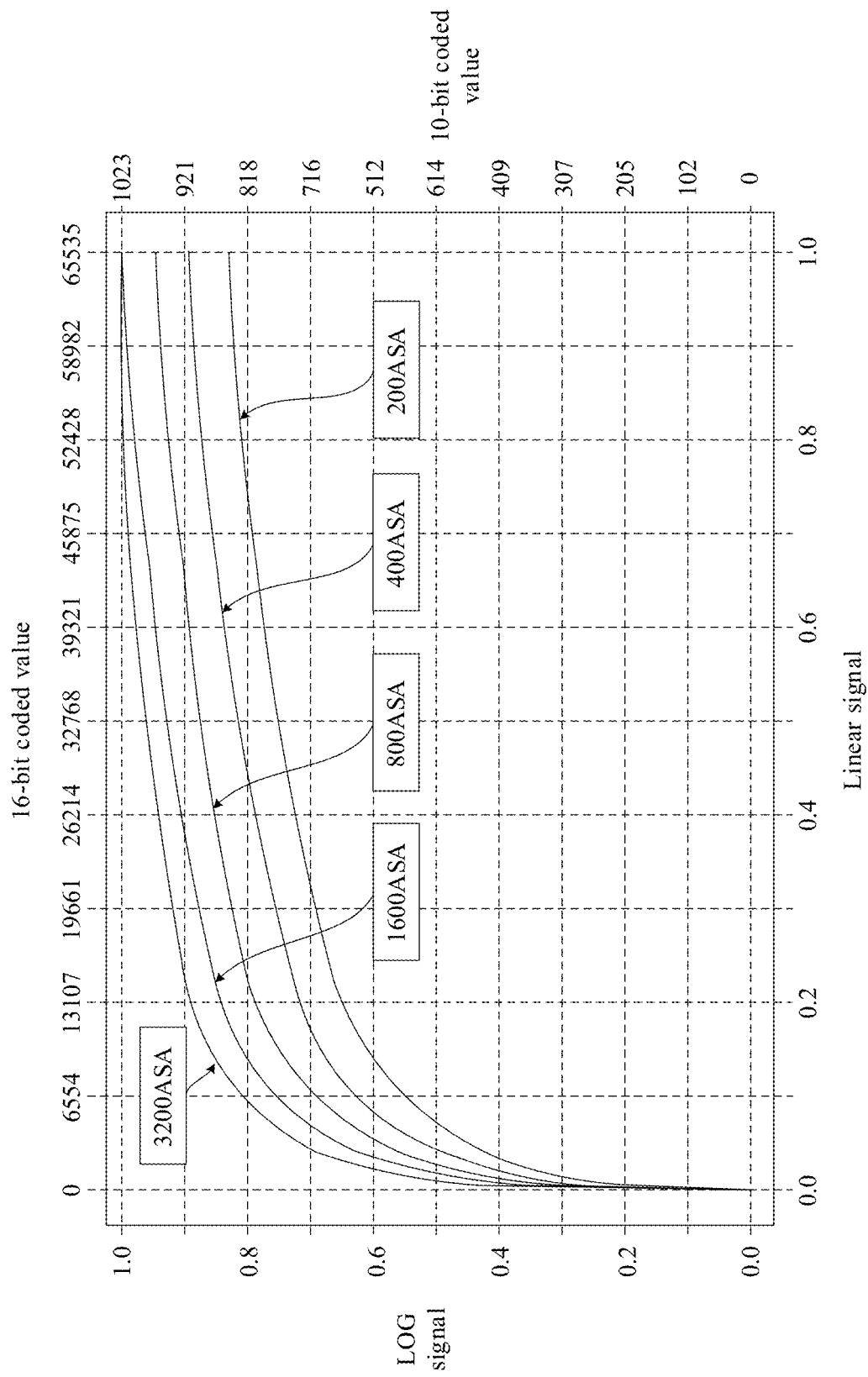
FIG. 4 is a schematic diagram of a LOG curve according to an embodiment of this application.

The LOG curve is a scene-based curve, and the LOG curve is slightly different in different ISOs. As the ISO increases, a maximum value of the LOG curve is also increased. When the ISO is increased to a level, a highlight is presented in a shoulder shape, keeping the highlight from overexposure. FIG. 4 illustrates a LOG curve in which an abscissa is a linear signal, expressed by a 16-bit coded value Code Value, and an ordinate is a LOG signal processed by using the LOG curve, expressed by a 10-bit coded value.

Through processing by using the LOG curve, a signal input of a camera lens may be used for encoding information of a dark interval to a middle tone (as shown in a steep part of the curve in FIG. 4), to form 10-bit signal output. This conforms to a LOG sensing rule for light by human eyes and keeps information of a dark part maximally. For a LOG video, a limited bit depth may be used for keeping details of a shadow and a highlight maximally. An ASA in FIG. 4 is photosensitivity, and different ASAs correspond to different ISOs, both of which belong to different standards.

Step 106: Process the LOG video based on a look up table (Look Up Table, LUT) to obtain a video processed by using the LUT.

Figure 5:
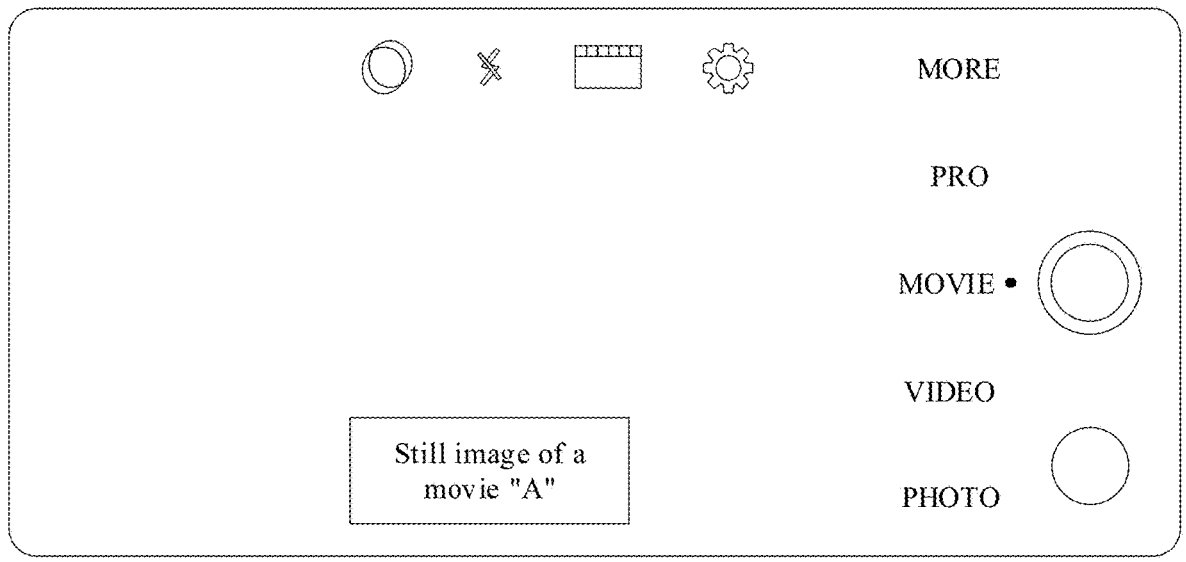
FIG. 5 is a schematic diagram of a user interface in a movie mode according to an embodiment of this application.

Specifically, the LUT is essentially a mathematical transformation model. One set of RGB values may be output as another set of RGB values by using the LUT, to change an exposure and a color of an image. In the first night mode, for example, there may be two LUT-based processing manners. One of the LUT-based processing manners is processing a video in a night scene by only the LUT, to improve a color restoration effect of a skin color of a portrait. In this manner, a corresponding LUT in the first night mode may be automatically used. The other of the LUT-based processing manners is processing a video in a night scene by using the LUT. In this manner, a color restoration effect of a skin color of a portrait can be improved, and different video styles may be used. Description is performed with the second method as an example below. LUTs corresponding to different video styles may be generated in advance. Before recording a video, the electronic device first determines a video style template. For example, the electronic device may determine the video style template based on a user selection or automatically determines the video style template based on a scene corresponding to an image obtained by a current camera lens through artificial intelligence (AI). For example, it is assumed that the electronic device is a mobile phone, in a possible implementation, as shown in FIG. 5, a user operates the mobile phone to display a shooting interface in a first night mode. The shooting interface includes a movie mode option. When the user further selects the movie mode option to display a movie mode, in another possible implementation, the movie mode is displayed for the user. The mobile phone determines and automatically displays a first night scene in a video image for preview shot through a camera lens. A corresponding movie mode interface includes a plurality of video style template options, including, for example, a style template of a movie "A", a style template of a movie "B", or a style template of a movie "C". Only the style template of a movie "A" is shown in the user interface shown in FIG. 5. It may be understood that a plurality of different movie style templates may be displayed side by side in the user interface. LUTs corresponding to different movie style templates may be generated in advance based on corresponding movie color matching styles, and color conversion of the LUTs has a style characteristic of a corresponding movie. For example, a color matching style of the movie "A" is a complementary color. The complementary color means that two corresponding colors form a contrast effect. Contrast is emphasized by two colors of a warm color system and a cold color system, to improve a bright and prominent effect. Usually, two contrasting colors symbolize a conflicting behavior. Through presentation of external complementary colors, that a role is in a conflict state or an exhausted state is expressed. A LUT corresponding to the style template of the movie "A" is used for presenting the complementary colors more distinctly after color mapping is transformed, to simulate the color matching style of the movie "A". In a possible implementation, as shown in FIG. 5, the user operates the mobile phone to display the movie mode, and the mobile phone obtains an image currently shot through a camera lens, determines a scene corresponding to the image according to an AI algorithm, and determines a recommended video style template corresponding to the scene. For example, if it is recognized that a subject of a currently shot image is a young female character, a corresponding recommended video style template is determined to be the style template of the movie "C" according to the algorithm. The movie "C" is a movie themed on the young female character, and a color matching style of the movie "C" may be simulated for a corresponding LUT. For example, if it is recognized that a currently shot image is a city street, a corresponding video style template is determined to be the style template of the movie "B" according to the algorithm. The movie "B" is a movie with a city street as a main scene, and a color matching style of the movie "B" may be stimulated for a corresponding LUT. In this way, a video style template conforming to a current scene may be automatically recommended to the user. A LUT appropriate for a mobile electronic device may be generated by pre-extraction from the movie style.

Different LUTs are used for the electronic device, and related modules in the electronic device may be adapted to LUTs of different styles. For example, if a predetermined video style template is a gray-tone video style template, a gray-tone image is characterized with a strong texture feeling, a low saturation, no more color interference except a color of a person's skin, and a cold color of a dark part. Based on these characteristics, the electronic device may adjust related module parameters while recording a video, keep a texture in an image without strong denoising and sharpening, appropriately reduce the saturation of the image, keep real restoration of a skin color in the image, and adjust the dark part of the image to a cold color.

In the video processing method in this embodiment of this application, during video recording, a LOG video is processed by using a LUT technology in a movie industry and based on a LUT corresponding to a determined video style template or a LUT corresponding to the first night mode. This enables a recorded video to have a style effect corresponding to the determined video style template, or a color restoration effect of a skin color of a portrait to be improved, to meet a high color correction requirement.

Figure 6:
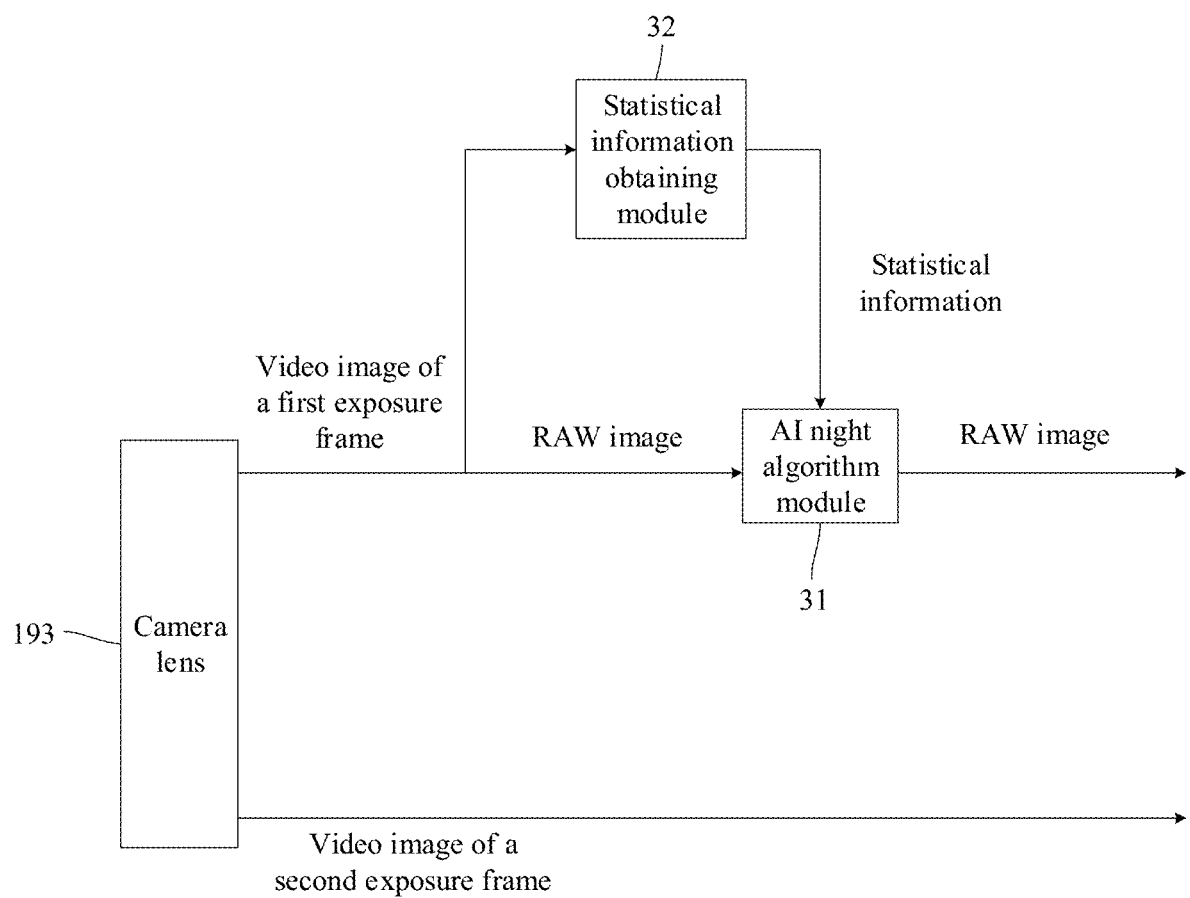
FIG. 6 is a flowchart of another video processing method according to an embodiment of this application.

In a possible implementation, as shown in FIG. 6, step 102 of processing the video image of a first exposure frame by using the AI night algorithm includes: Obtaining statistical information corresponding to the video image of a first exposure frame; and using the statistical information and a RAW image of the video image of a first exposure frame as inputs to be processed by using the AI night algorithm, to obtain a processed RAW image of the video image of a first exposure frame.

Specifically, the RAW image is raw data in which a sensor in a camera lens converts a captured light source signal into a digital signal. For example, the electronic device includes a camera lens 193, an AI night algorithm module 31, and a statistical information obtaining module 32. The statistical information obtaining module 32 may be a module in an ISP. In step 101, the video image of a first exposure frame and the video image of a second exposure frame are obtained by using the camera lens 193, and the video image of a first exposure frame is transmitted to the statistical information obtaining module 32 and the AI night algorithm module 31. The statistical information obtaining module 32 obtains stats statistical information corresponding to an image based on the video image of a first exposure frame and transmits the statistical information to the AI night algorithm module 31. The video image of a first exposure frame transmitted to the AI night algorithm module 31 may be a RAW image. The AI night algorithm module 31 uses the RAW image as an input, and processes the video image of a first frame based on obtained corresponding statistical information, to obtain a processed RAW image, and outputs the processed RAW image to a subsequent process. It should be noted that in this embodiment, a process of processing by using the AI night algorithm is performed by using the AI night algorithm module 31 in a RAW domain in an entire image processing process. In another possible implementation, for example, the process of processing by using the AI night algorithm may be alternatively performed in a YUV domain.

The following describes relevant content of the RAW and YUV.

Bayer domain: Each lens on a digital camera is provided with an optical sensor to measure luminance of light. However, to obtain a full-color image, three optical sensors are usually required to obtain information on three primary colors, red, green, and blue, respectively. To reduce costs and a volume of the digital camera, a manufacturer usually uses a CCD image sensor or CMOS image sensor. Usually, a raw image output by the CMOS image sensor is in RGB format of the Bayer domain, and a single pixel includes only one color value. To obtain a gray value of an image, color information of each pixel is to be inserted and supplemented, and then a gray value of each pixel is to be calculated. In other words, the Bayer domain means a raw image format in the digital camera.

The RAW domain, alternatively referred to as a RAW format, means an unprocessed image. Further, the RAW image may be understood as raw data of a digital signal into which a photosensitive element of a camera, such as a complementary metal oxide semiconductor (Complementary Metal Oxide Semiconductor, CMOS) or a charge-coupled device (Charge-coupled Device, CCD), converts a captured light source signal. A RAW file is a file in which raw information of a sensor of the digital camera is recorded, and setting of some metadata (Metadata, such as photosensitivity ISO (International Organization for Standardization), a shutter speed, an aperture value, and a white balance) generated due to shooting by the camera is recorded. The RAW domain is a format without non-linear processing and compression by the ISP. A full name of the RAW format is a RAW image format.

YUV is a color encoding method and is usually used in various video processing components. When encoding a picture or a video, in consideration of human perceptibility, YUV allows a bandwidth of chrominance to be reduced. YUV is a kind of compiled true-color space (color space), and proprietary terms such as Y'UV, YUV, YCbCr, and YPbPr may all be referred to as YUV, and overlap each other. "Y" represents luminance (Luminance or Luma), that is, a grayscale value. "U" and "V" represent chrominance (Chrominance or Chroma), and are used for describing a color and saturation of a video and specifying a color of a pixel. Generally, YUV is divided into two formats. One of the two formats is a packed format (packed formats) in which Y, U, V are stored as a macro pixels array in a manner similar to a manner in which RGB is stored. The other of the two formats is a planar format (planar formats) in which three components of Y, U, and V are stored in different matrices respectively. The planar format (planar format) means that every Y component, U component, and V component are organized in separate planes, that is, all U components are behind the Y component, and the V component is behind all U components.

Figure 7:
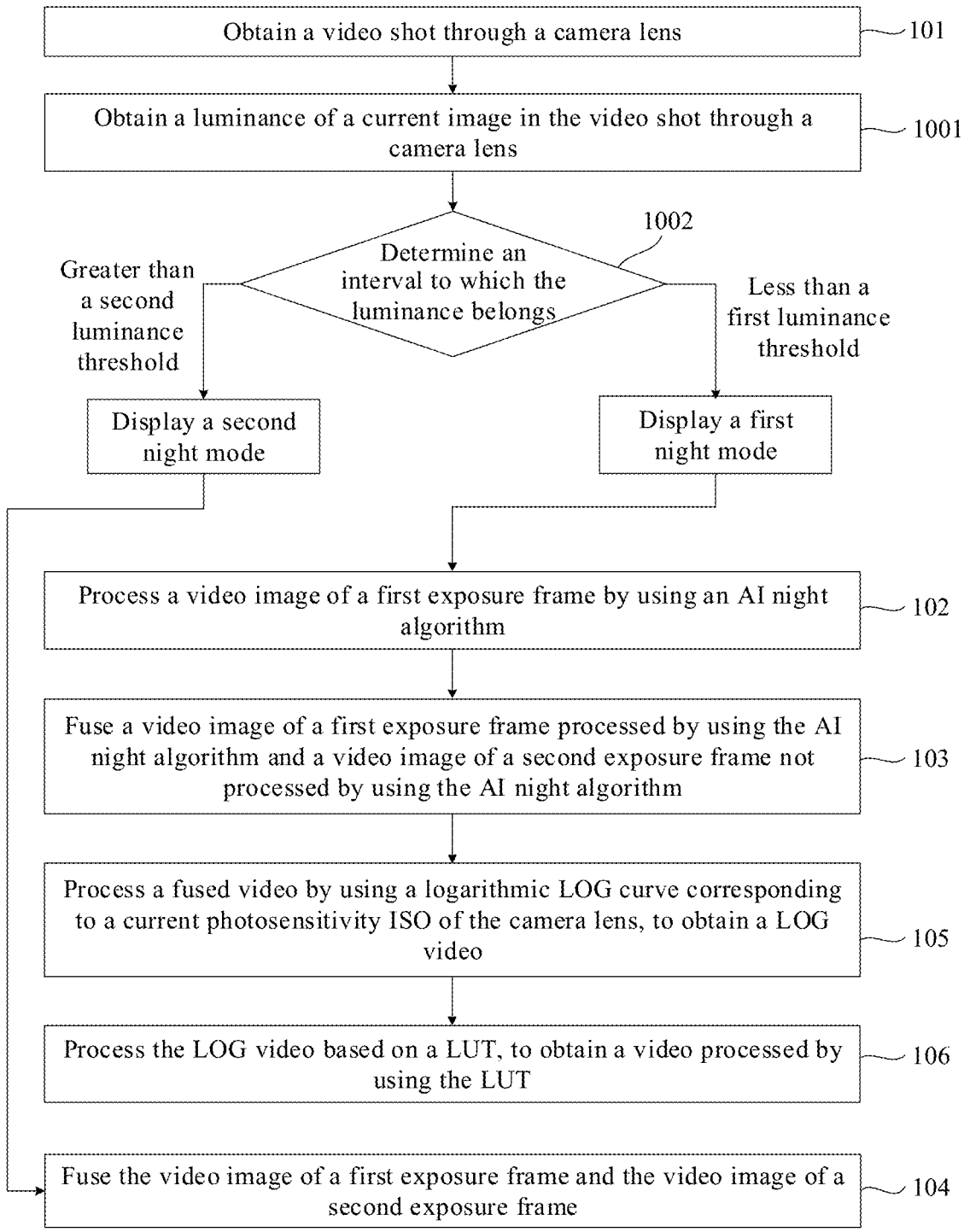
FIG. 7 is a schematic diagram of a specific schematic flowchart of some steps according to an embodiment of this application.

In a possible implementation, as shown in FIG. 7, the video processing method further includes the following steps. Step 1001: Periodically obtain a luminance of a current image in the video shot through the camera lens. Step 1002: Determine an interval to which the luminance belongs, and if the luminance is less than a first luminance threshold, display a first night mode, or if the luminance is greater than a second luminance threshold, display a second night mode, where the first luminance threshold is less than the second luminance threshold.

Specifically, in a night scene, a first night mode and a second night mode are further divided based on an image luminance. The first night mode is corresponding to a low-light night scene, and the second night mode is corresponding to a light night scene. In different night modes, fusion weights of a video image of a first exposure frame are different. To prevent frequent switching of algorithms, the first luminance threshold is set to be less than the second luminance threshold. For example, a current mode is the second night mode, and an image luminance is greater than the second luminance threshold. In this case, if the image luminance is gradually reduced to be less than the second luminance threshold and greater than the first luminance threshold, the night mode is still the second night mode and is not switched to the first night mode until the image luminance is reduced to be less than the first luminance threshold. Similarly, in the first night mode, if the image luminance is gradually increased, when the image luminance is increased to be greater than the first luminance threshold and less than the second luminance threshold, the night mode is still the first night mode and is not switched to the second night mode until the image luminance is increased to be greater than the second luminance threshold. In this logic, ping-pong handover of different night modes with a single threshold may be prevented. It should be noted that for a strategy for determining an initial night mode, a determining logic used when the image luminance is between the first luminance threshold and the second luminance threshold may be added, to divide a scene of any image luminance into a corresponding night mode. Further, during switching between the first night mode and the second night mode, change of a fusion weight of the video image of a first exposure frame during fusion may be smoothly adjusted to further reduce a mutation effect of a video image. For example, the fusion weight of the video image of a first exposure frame in the first night mode is 70%, and the fusion weight of the video image of a first exposure frame in the second night mode is 50%. During switching from the first night mode to the second night mode, the fusion weight of the video image of a first exposure frame may be gradually changed from 70% to 50%. Similarly, during switching from the second night mode to the first night mode, the fusion weight of the video image of a first exposure frame may be gradually changed from 50% to 70%.

In a possible implementation, in the first night mode, a video is obtained in a manner of non-overlapping exposure. In the second night mode, a video is obtained in a manner of overlapping exposure.

Specifically, a camera lens captures a frame of image in two stages: exposure and readout. The non-overlapping exposure means that exposure and readout of a next frame are performed only after exposure and readout of a current frame are completed. The overlapping exposure means that exposure of a current frame overlaps readout of a previous frame, that is, a next frame starts to be exposed while a previous frame is being read out. A stagger high-dynamic range (High-Dynamic Range, HDR) technology may be used in the second night mode, to increase a dynamic range. However, in this mode, a longest time for which the video image of a first exposure frame is exposed is limited, and noise is amplified, which is not appropriate for the low-light night scene. Therefore, in the solution provided in this embodiment of this application, switching of different night modes is implemented based on the image luminance at night.

In a possible implementation, step 106: processing a LOG video based on a look up table (Look Up Table, LUT), to obtain a video processed by using the LUT includes the following.

Cube interpolation space is established based on the LUT, where the LUT is a 3D-LUT.

Implementation of the 3D-LUT is performed in the RGB domain, and the 3D-LUT is a color correction and mapping relationship commonly used in a movie industry. An arbitrarily input RGB pixel value may be converted into a corresponding another RGB pixel value. For example, if a 12-bit RGB video image is input, a 12-bit RGB video image obtained after LUT processing and mapping is output. Entire RGB color space is evenly divided into, for example, 33×33×33 cubes, to be corresponding to the LUT. A side length step_size of each cube is, for example, $2^{(12-5)}=2^7$.

A cube to which each pixel in a LOG video belongs in the cube interpolation space is determined, where the cube is divided into six tetrahedrons.

The LOG video is used as an input during LUT processing. A pixel is obtained by processing and mapping each pixel in an image of the LOG video by using the LUT, that is, a process of processing the LOG video by using the LUT may be implemented. A cube to which each pixel in each LOG video as an input belongs in the foregoing cube interpolation space is to be determined, and the cube is divided into six tetrahedrons.

A tetrahedron to which each pixel in the LOG video belongs is determined.

A pixel value of a pixel corresponding to a vertex of a cube is converted into a pixel value obtained by LUT processing. Interpolation is performed, based on a tetrahedron to which each pixel belongs, on a pixel not corresponding to the vertex of the cube, and the pixel value is converted into a pixel value obtained by LUT processing.

Specifically, if an input pixel is located at a vertex of a cube, a mapped RGB pixel value may be directly obtained based on an index of the vertex and 3D-LUT, that is, a pixel value of the pixel may be mapped and converted into a corresponding pixel value directly by using the LUT. If the pixel is located between vertices of the cube, interpolation is performed based on the tetrahedron to which the pixel belongs.

Figure 8:
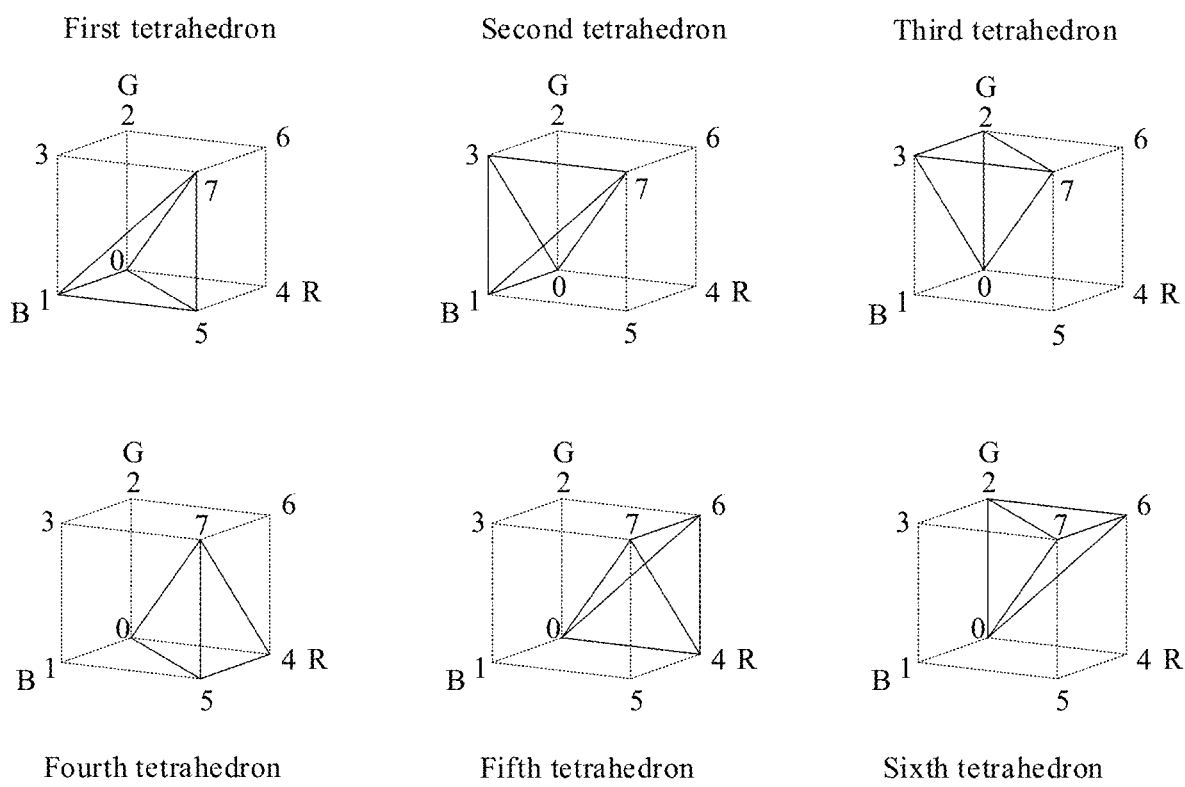
FIG. 8 is a schematic diagram of relations between cubes and tetrahedrons in cube interpolation space according to an embodiment of this application.

In a possible implementation, as shown in FIG. 8, a cube has a $0^{th}$ vertex to a $7^{th}$ vertex, which are respectively expressed by numbers 0 to 7 in FIG. 8. A direction from the $0^{th}$ vertex to a $1^{st}$ vertex is a coordinate axis direction of a blue B channel. A direction from the $0^{th}$ vertex to a $4^{th}$ vertex is a coordinate axis direction of a red R channel. A direction from the $0^{th}$ vertex to a $2^{nd}$ vertex is a coordinate axis direction of a green G channel. The $0^{th}$ vertex, the $1^{st}$ vertex, the $2^{nd}$ vertex, and a 3rd vertex are located in a same plane. The $1^{st}$ vertex, the $3^{rd}$ vertex, a $5^{th}$ vertex, and the $7^{th}$ vertex are located in a same plane. The $4^{th}$ vertex, the $5^{th}$ vertex, a $6^{th}$ vertex, and the $7^{th}$ vertex are located in a same plane. The $0^{th}$ vertex, the $2^{nd}$ vertex, the $4^{th}$ vertex, and the $6^{th}$ vertex are located in a same plane. The $0^{th}$ vertex, the $1^{st}$ vertex, the $5^{th}$ vertex, and the $7^{th}$ vertex form a first tetrahedron. The $0^{th}$ vertex, the $1^{st}$ vertex, the $3^{rd}$ vertex, and the $7^{th}$ vertex form a second tetrahedron. The $0^{th}$ vertex, the $2^{nd}$ vertex, the $3^{rd}$ vertex, and the $7^{th}$ vertex form a third tetrahedron. The $0^{th}$ vertex, the $4^{th}$ vertex, the $5^{th}$ vertex, and the $7^{th}$ vertex form a fourth tetrahedron. The $0^{th}$ vertex, the $4^{th}$ vertex, the $6^{th}$ vertex, and the 7th vertex form a fifth tetrahedron. The $0^{th}$ vertex, the $2^{nd}$ vertex, the $6^{th}$ vertex, and the $7^{th}$ vertex form a sixth tetrahedron. Coordinates of an $i^{th}$ vertex are (Ri, Gi, Bi), and a value of i is 0, 1, 2, 3, . . . , or 7. A pixel value of the $i^{th}$ vertex obtained by LUT processing is VE (Ri, Gi, Bi), where E is R, G, and B respectively.

The process of performing interpolation, based on a tetrahedron to which each pixel belongs, on a pixel not corresponding to the vertex of the cube, and converting the pixel value into a pixel value obtained by LUT processing includes the following.

A pixel value VE (R, G, B) of a E channel obtained by LUT processing is generated based on a current pixel (R, G, B), where E is R, G, and B respectively, and the current pixel means a pixel to be interpolated currently in an input LOG video.

VE(R,G,B)=VE(R0,G0,B0)+(delta_valueR_E×deltaR+delta_valueG_E×deltaG+delta_valueB_E×deltaB+(step_size>>1))/(step_size).

VE (R0, G0, B0) is a pixel value of a E channel obtained by LUT processing at the $0^{th}$ vertex (R0, G0, B0), where E is R, G, and B respectively.

delta_valueR_E is a difference between pixel values of the E channel that are obtained by LUT processing and that are of two vertices in the coordinate axis direction of the R channel corresponding to a tetrahedron to which the current pixel belongs. delta_valueG_E is a difference between pixel values of the E channel that are obtained by LUT processing and that are of two vertices in the coordinate axis direction of the G channel corresponding to a tetrahedron to which the current pixel belongs. delta_valueB_E is a difference between pixel values of the E channel that are obtained by LUT processing and that are of two vertices in the coordinate axis direction of the B channel corresponding to a tetrahedron to which the current pixel belongs.

deltaR is a difference between an R value in the current pixel (R, G, B) and an R0 value in the $0^{th}$ vertex (R0, G0, B0). deltaG is a difference between a G value in the current pixel (R, G, B) and a G0 value in the $0^{th}$ vertex (R0, G0, B0). deltaB is a difference between a B value in the current pixel (R, G, B) and a B0 value in the $0^{th}$ vertex (R0, G0, B0).

step_size is a side length of the cube.

>> represents a right shift operation, and (step_size>>1) represents a right shift of step_size by one bit.

Specifically, for example, for the input current pixel (R, G, B), deltaR, deltaG, and deltaB are calculated. deltaR, deltaG, and deltaB represent distances between the current pixel (R, G, B) and the $0^{th}$ vertex respectively, and deltaR=R−R0, deltaG=G−G0, and deltaB=B−B0. A tetrahedron to which the current pixel belongs may be determined based on a relationship between deltaR, deltaG, and deltaB. If deltaB≥deltaR and deltaR≥deltaG, it is determined that the current pixel belongs to the first tetrahedron. If deltaB≥deltaG and deltaG≥deltaR, it is determined that the current pixel belongs to the second tetrahedron. If deltaG≥deltaB and deltaB≥deltaR, it is determined that the current pixel belongs to the third tetrahedron. If deltaR≥deltaB and deltaB≥deltaG, it is determined that the current pixel belongs to the fourth tetrahedron. If deltaR≥deltaG and deltaG≥deltaB, it is determined that the current pixel belongs to the fifth tetrahedron. If the relationship between deltaR, deltaG, and deltaB does not meet any condition for the first tetrahedron to the fifth tetrahedron, it is determined that the current pixel belongs to the sixth tetrahedron. It is assumed that the current pixel (R, G, B) belongs to the first tetrahedron, during calculation of a pixel value VR (R, G, B) of the R channel of the pixel after LUT processing, delta_valueR_E is a difference between pixel values of the E channel that are obtained by LUT processing and that are of two vertices in the coordinate axis direction of the R channel corresponding to a tetrahedron to which the current pixel belongs, that is, delta_valueR_R=VR (R5, G5, B5)−VR (R1, G1, B1), delta_valueG_R=VR (R7, G7, B7)−VR (R5, G5, B5), delta_valueB_R=VR (R1, G1, B1)−VR (R0, G0, B0), VR (R, G, B)=VR (R0, G0, B0)+(delta_valueR_R×deltaR+delta_valueG_R×deltaG+delta_valueB_R×deltaB+(step_size>>1))/(step_size). During calculation of a pixel value VG (R, G, B) of the G channel of the pixel after LUT processing, delta_valueG_E is a difference between pixel values of the E channel that are obtained by LUT processing and that are of two vertices in the coordinate axis direction of the G channel corresponding to a tetrahedron to which the current pixel belongs, that is, delta_valueR_G=VR (R5, G5, B5)−VR (R1, G1, B1), delta_valueG_G=VG (R7, G7, B7)−VG (R5, G5, B5), delta_valueB_G=VG (R1, G1, B1)−VG (R0, G0, B0), VG (R, G, B)=VG (R0, G0, B0)+(delta_valueR_G×deltaR+delta_valueG_G×deltaG+delta_valueB_G×deltaB+(step_size>>1))/(step_size). During calculation of a pixel value VG (R, G, B) of the B channel of the pixel after LUT processing, delta_valueB_E is a difference between pixel values of the E channel that are obtained by LUT processing and that are of two vertices in the coordinate axis direction of the B channel corresponding to a tetrahedron to which the current pixel belongs, that is, delta_valueR_B=VB (R5, G5, B5)−VB (R1, G1, B1), delta_valueG_B=VB (R7, G7, B7)−VB (R5, G5, B5), delta_valueB_B=VB (R1, G1, B1)−VB (R0, G0, B0), VB (R, G, B)=VB (R0, G0, B0)+(delta_valueR_B×deltaR+delta_valueG_B×deltaG+delta_valueB_B×deltaB+(step_size>>1))/(step_size). If the current pixel (R, G, B) belongs to another tetrahedron, the calculation process is similar, and a difference lies in calculation of delta_valueR_E. For example, for the second tetrahedron, delta_valueR_R=VR (R7, G7, B7)−VR (R3, G3, B3), delta_valueG_R=VR (R3, G3, B3)−VR (R1, G1, B1), delta_valueB_R=VR (R1, G1, B1)−VR (R0, G0, B0). The calculation process based on the another tetrahedron is not described herein in detail.

In a possible implementation, before step 106: processing a LOG video based on a look up table (Look Up Table, LUT) to obtain a video processed by using the LUT, the method further includes: converting the LOG video from a LOG video in RGB color space to a LOG video in YUV color space; and performing YUV denoising on the LOG video in the YUV color space, to obtain a denoised LOG video. The LOG video using the LUT in step 106 is the LOG video obtained by YUV denoising. Because the LOG video obtained in step 105 can reflect details in a dark part, but amplify noise in the dark part simultaneously, that is, noise is introduced, the LOG video may be converted into a LOG video in the YUV color space and then subject to YUV denoising, and the noise is reduced by using an algorithm, to improve quality of a video image.

In a possible implementation, before step 106: processing a LOG video based on a look up table (Look Up Table, LUT) to obtain a video processed by using the LUT, the method further includes: converting the denoised LOG video from the LOG video in the YUV color space to the LOG video in the RGB color space. After step 106: processing a LOG video based on a look up table (Look Up Table, LUT) to obtain a video processed by using the LUT, the method further includes: converting the video processed by using the LUT in the RGB color space to a video in the YUV color space. Because a process of processing the LOG video based on the LUT in step 106 is implemented based on the RGB color space, before step 105, the video in the YUV color space is first converted into the video in the RGB color space, and then after step 106, the video in the RGB color space is reconverted into the video in the YUV color space.

Figure 9:
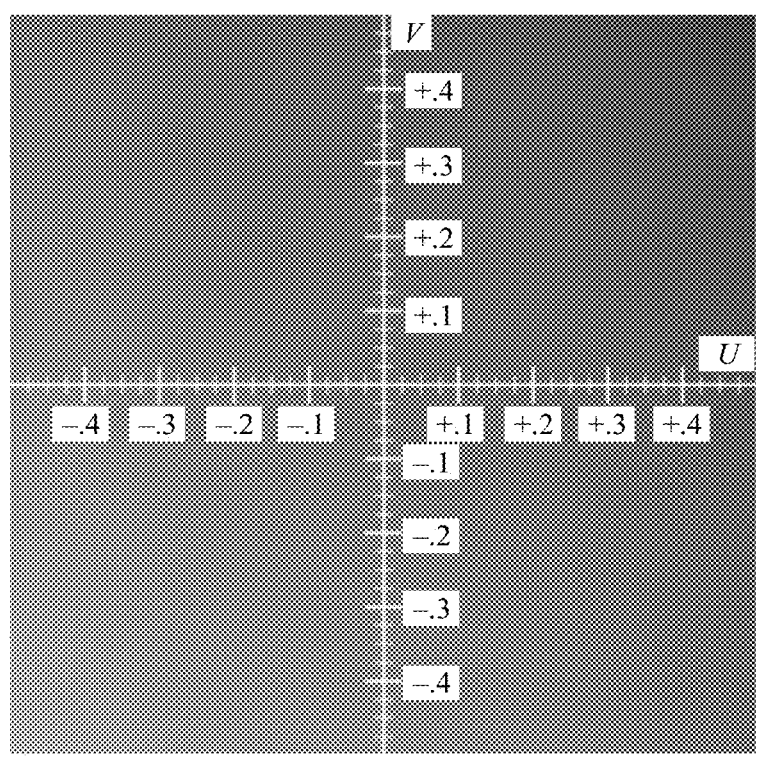
FIG. 9 is a schematic diagram of a UV plane.

YUV (also referred to as YCbCr) is a color coding method used in a European television system. In a modern color television system, a three-tube color camera or a color CCD camera is usually used for image shooting, and then an obtained color image signal is subject to color separation, amplification, and correction, so that an RGB signal is obtained. The RGB signal is then changed into a luminance signal Y and two color difference signals B−Y (U) and R−Y (V) by using a matrix conversion circuit. Finally, a transmit end encodes the three signals and then transmits encoded signals through a same channel. This color representation method is the YUV color space. YCbCr is a specific implementation of a YUV model and is actually a scaled and shifted copy of YUV. Y has a same meaning as Y in YUV, and Cb and Cr both mean colors, except that Cb and Cr differ in a representation method. In a YUV family, YCbCr is a most widely used member in a computer system and is used in a wide application field, such as JPEG and MPEG. Generally, YUV mostly means YCbCr. A UV plane is shown in FIG. 9.

Interconversion of the RGB color space and the YUV color space may be implemented by a matrix of 3×3:

$$\begin{pmatrix} Y \\ U \\ V \end{pmatrix} = M_{rgb2yuv} \begin{pmatrix} R \\ G \\ B \end{pmatrix}, \begin{pmatrix} R \\ G \\ B \end{pmatrix} = M_{yuv2rgb} \begin{pmatrix} Y \\ U \\ V \end{pmatrix}$$

YUV has four main sampling formats: YCbCr 4:2:0, YCbCr 4:2:2, YCbCr 4:1:1, and YCbCr 4:4:4.

Figure 10A:
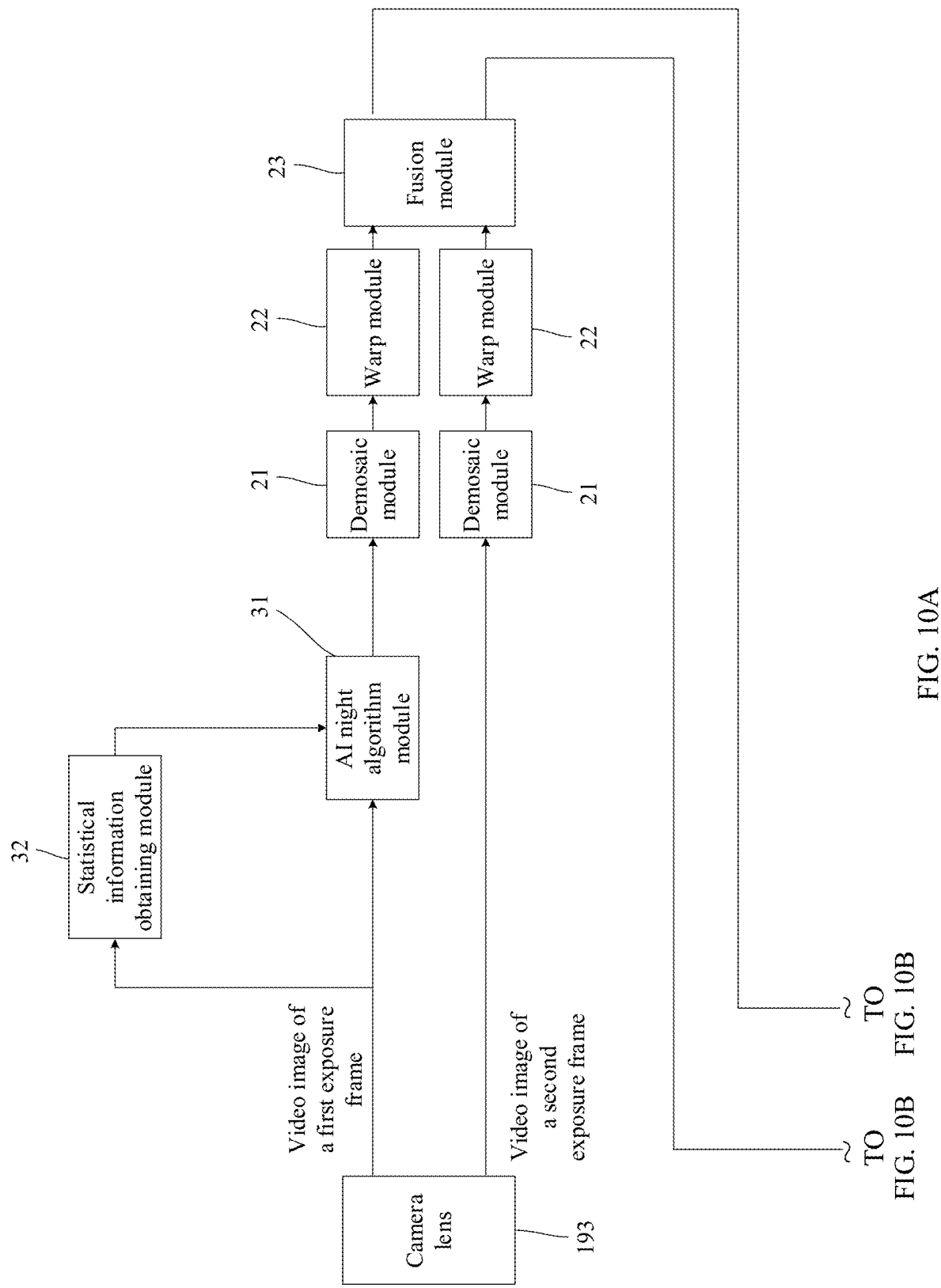
FIG. 10A and FIG. 10B are a block diagram of another structure of an electronic device according to an embodiment of this application.
Figure 10B:
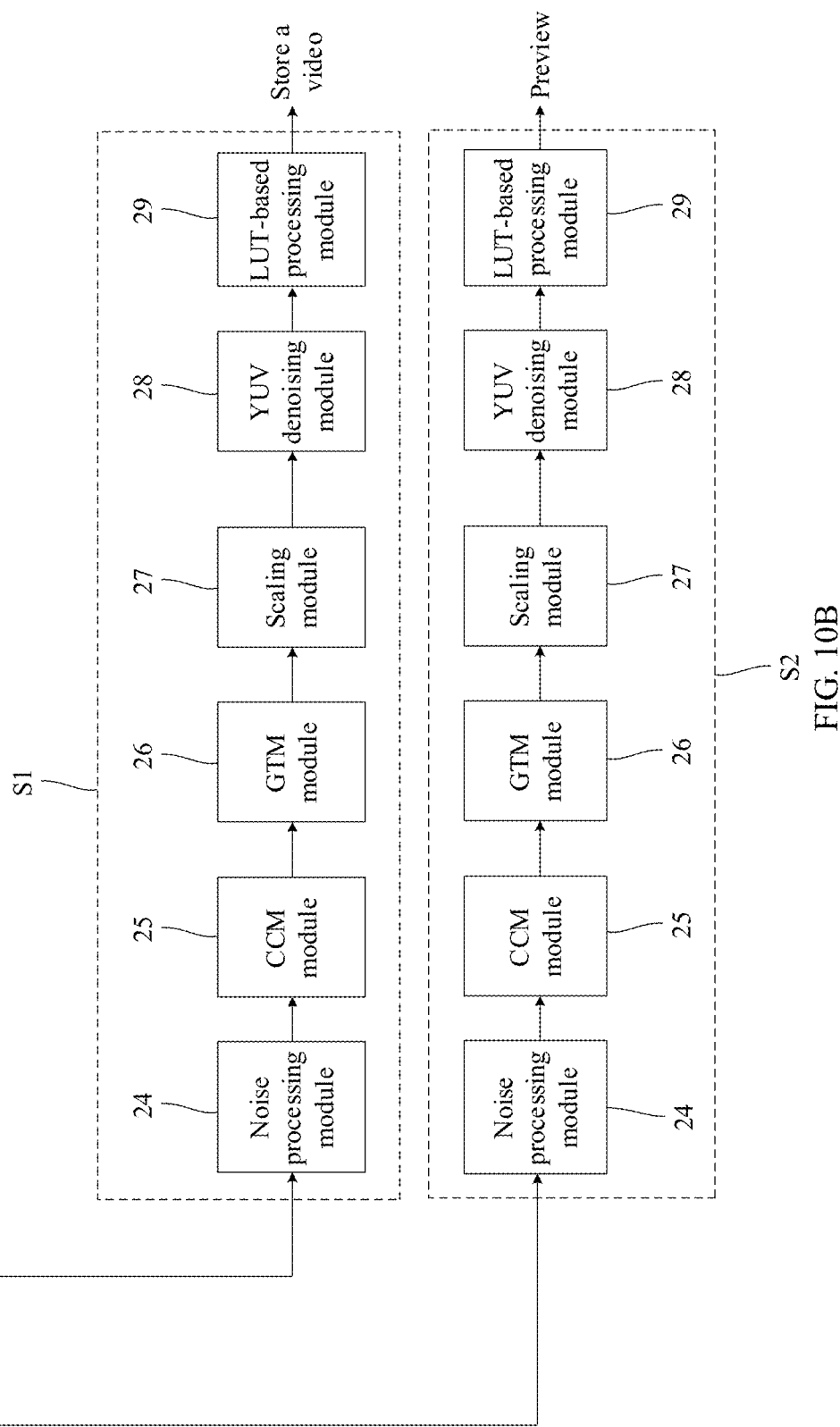

In a possible implementation, as shown in FIG. 10A and FIG. 10B, an electronic device may specifically include a camera lens 193, an AI night algorithm module 31, a statistical information obtaining module 32, demosaic (Demosaic) modules 21, warp modules 22, a fusion module 23, noise processing modules 24, color correction matrix (Color Correction Matrix, CCM) modules 25, global tone mapping (Global Tone Mapping, GTM) modules 26, scaling (Scaler) modules 27, YUV denoising modules 28, and LUT-based processing modules 29. For example, during video recording, the camera lens 193 obtains a video image of a first exposure frame and a video image of a second exposure frame by shooting. An exposure time corresponding to the video image of a first exposure frame is greater than an exposure time corresponding to the video image of a second exposure frame. In a first night mode, the statistical information obtaining module 32 obtains statistical information corresponding to the video image of a first exposure frame, and the AI night algorithm module 31 processes the statistical information and a RAW image of the video image of a first exposure frame as inputs to be processed by using the AI night algorithm, to obtain a RAW image that is of the video image of a first exposure frame and that is processed by using the AI night algorithm. A video image of a first exposure frame processed by using the AI night algorithm and the video image of a second exposure frame not processed by using the AI night algorithm are processed by the demosaic module 21 respectively. This enables the images to be converted from a RAW domain to an RGB domain. Then the two video images are processed by the warp module 22 respectively, so that alignment and stabilization effects are achieved by warping the video images. Then the two video images are processed by the fusion module 23, so that the two video images are fused as one video image, and fused data is divided into two data streams. A video processing method includes a first video processing procedure S1 and a second video processing procedure S2. One of the two data streams processed by the fusion module 23 enters the first video processing procedure S1 and the other of the two data streams enters the second video processing procedure S2.

In the first video processing procedure S1, a process of converting a video shot through a camera lens into a video in wide-gamut color space, a process of processing a video by using a logarithm LOG curve to obtain a LOG video, and a process of processing the LOG video based on a LUT are performed.

For example, the first video processing procedure S1 includes: The noise processing module 24 denoises a video that is from the fusion module 23 and that is shot through the camera lens 193, the CCM module 25 processes a denoised video to be converted into a video in wide-gamut RGB color space, the GTM module 26 processes a converted fused video by using a logarithm LOG curve corresponding to a current photosensitivity ISO of the camera lens, to obtain a LOG video, the scaling module 27 scales a processed video, the YUV denoising module 28 performs YUV denoising on a scaled video, and then the LUT-based processing module 29 processes a LOG video obtained by YUV denoising based on a look up table LUT, to obtain a video processed by using the LUT. After the first video processing procedure S1, the video processed by using the LUT in the first video processing procedure S1 is stored as a recorded video.

The second video processing procedure S2 includes: The noise processing module 24 denoises a video that is from the fusion module 23 and that is shot through the camera lens 193, the CCM module 25 processes a denoised video to be converted into a video in wide-gamut RGB color space, the GTM module 26 processes a converted fused video by using a logarithm LOG curve corresponding to a current photosensitivity ISO of the camera lens, to obtain a LOG video, the scaling module 27 scales the LOG video, the YUV denoising module 28 performs YUV denoising on a scaled video, and then the LUT-based processing module 29 processes a LOG video obtained by YUV denoising based on a look up table LUT, to obtain a video processed by using the LUT. After the second video processing procedure S2, the video processed by using the LUT in the second video processing procedure S2 is previewed.

Only a specific video recording process in the first night mode is described above. Based on a determining process in step 1002, the second night mode may be switched to and displayed during recording. In the second night mode, processing by using the AI night algorithm is not performed. The video image of a first exposure frame and the video image of a second exposure frame are respectively processed by the demosaic modules 21 to be converted from the RAW domain into the RGB domain. Then the two video images are respectively processed by the warp module 22. Alignment and stabilization effects can be achieved by warping the video images. Then the two video images are processed by the fusion module 23 to be fused into one video image. In the second night mode, a fusion weight of the video image of a first exposure frame video is less than a fusion weight of the video image of a first exposure frame in the first night mode. A process of video image processing after fusion in the second night mode may be the same as or different from a process of video image processing after fusion in the first night mode, which is not limited in this embodiment of this application.

Figure 11:
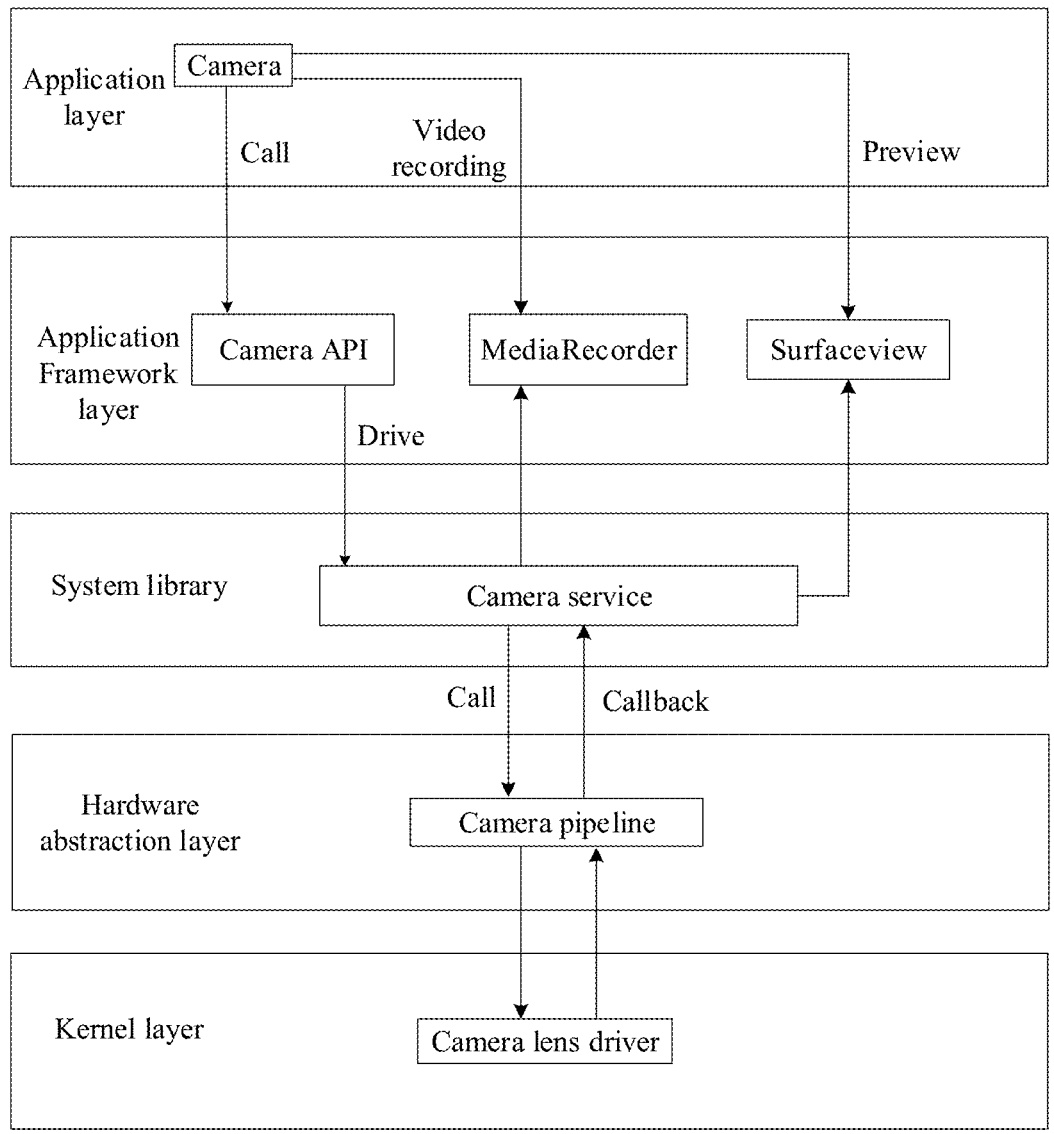
FIG. 11 is a block diagram of a software structure of an electronic device according to an embodiment of this application.

Embodiments of this application are described below with reference to a software architecture. In an embodiment of this application, an Android system of a layered architecture is used as an example to describe a software structure of the electronic device 100. FIG. 11 is a block diagram of the software structure of the electronic device 100 according to an embodiment of this application.

Software is divided into several layers by using the layered architecture, and each layer has a definite role and task. The layers communicate with each other by using a software interface. In some embodiments, an Android system is divided into five layers: an application (Application) layer, an application framework (framework) layer, a system library (library), a hardware abstraction layer (Hardware Abstraction Layer, HAL) layer, and a kernel layer from top to bottom.

The application layer may include applications such as a camera.

The application framework layer may include a camera application programming interface (Application Programming Interface, API), MediaRecorder, Surfaceview, and the like. MediaRecorder is configured to record video or picture data and to enable such data accessible to an application. Surfaceview is configured to display a previewed image.

The system library may include a plurality of functional modules, for example, CameraSevice.

The hardware abstraction layer is configured to provide interface support, including, for example, a camera pipeline CameraPipeline to be called by a camera service.

The kernel layer is a layer between hardware and software. The kernel layer includes a display driver, a camera lens driver, and the like.

With reference to a specific scene in which a video is captured, the application layer sends a CaptureRequest. The request is corresponding to a stream of a video and a preview stream. The HAL calls back two streams based on the dataflow (dataflow). The preview stream is sent for display, and the stream of a video is sent to a mediacodec.

The recorded video processing method provided in embodiments of this application may be represented by a plurality of functions in two shooting modes. The two shooting modes may mean a movie mode and a professional mode.

The movie mode is a shooting mode related to a movie theme. In this mode, an image displayed by an electronic device 100 may present an effect of viewing a movie to the user from senses. The electronic device 100 further provides a plurality of video style templates related to the movie theme. The user may use the video style templates to obtain a tone-adjusted image or video. Tones of the images or videos are similar to or the same as tones of a movie. In the following embodiments of this application, in the movie mode, at least an interface for the user to trigger a LUT function and an HDR10 function may be provided. Refer to the following embodiment for description of the LUT function and the HDR10 function in detail.

For example, it is assumed that the electronic device 100 is a mobile phone. In a possible implementation, as shown in FIG. 5, the electronic device may display a movie mode in response to an operation of a user. For example, the electronic device 100 may detect a touch operation performed by the user on a camera application. In response to the operation, the electronic device 100 displays a default shooting interface of the camera application. The default shooting interface may include: a preview box, a shooting mode list, a gallery shortcut key, a shutter control, and the like.

The preview box may be used for displaying an image captured by a camera lens 193 in real time. The electronic device 100 may refresh display content in the preview box in real time, so that the user previews an image currently captured by the camera lens 193.

One or more shooting mode options may be displayed in the shooting mode list. The one or more shooting mode options may include: a portrait mode option, a video mode option, a photo mode option, a movie mode option, and a professional option. The one or more shooting mode options may be expressed as text information on an interface, such as "PORTRAIT", "VIDEO", "PHOTO", "MOVIE", and "PRO". This application is not limited thereto. The one or more shooting mode options may be alternatively displayed as icons or interactive elements (interactive element, IE) in other forms on the interface.

The gallery shortcut may be used for starting a gallery application. The gallery application is an application for picture management on an electronic device such as a smartphone or a tablet computer, and may also be referred to as an "album". A name of the application is not limited in this embodiment. The gallery application may support the user in performing various operations on a picture stored in the electronic device 100, for example, operations such as browsing, editing, deleting, and selecting.

The shutter control may be configured to monitor an operation performed by the user to trigger shooting. The electronic device 100 may detect a user operation acting on the shutter control. In response to the operation, the electronic device 100 may store an image in the preview box as a picture in the gallery application. In addition, the electronic device 100 may further display a thumbnail of a stored image in the gallery shortcut. That is, the user may tap the shutter control to trigger image shooting. The shutter control may be a button or a control in another form.

The electronic device 100 may detect a touch operation by a user acting on the movie mode option. In response to the operation, the electronic device displays a user interface shown in FIG. 5.

In some embodiments, the electronic device 100 may start the movie mode by default after the camera application is started. This application is not limited thereto. The electronic device 100 may alternatively start the movie mode in another manner. For example, the electronic device 100 may alternatively start the movie mode based on a voice instruction of a user, which is not limited in this embodiment of this application.

The electronic device 100 may detect a touch operation by a user acting on the movie mode option. In response to the operation, the electronic device displays a user interface shown in FIG. 5.

The user interface shown in FIG. 5 includes functional options including an HDR10 option, a flash option, a LUT option, and a setting option. The plurality of functional options may detect a touch operation of the user. In response to the operation, a corresponding shooting function is enabled or disabled, such as an HDR10 function, a flash function, a LUT function, and a setting function.

The electronic device may enable the LUT function. The LUT function may change a display effect of a previewed image. Actually, a look up table is introduced in the LUT function. The look up table is equivalent to a color conversion model capable of outputting an adjusted color value based on an input color value. A color value of an image captured by a camera lens is equivalent to an input value. After different color values pass through the color conversion model, output values can be obtained correspondingly. Finally, an image displayed in the preview box is an image adjusted by the color conversion model. The electronic device 100 uses the LUT function to display an image including color values adjusted by the color conversion model, to achieve an effect of adjusting an image tone. After the LUT function is enabled, the electronic device 100 may provide a plurality of video style templates. One video style template is corresponding to one color conversion model, and different video style templates may bring different display effects to a previewed image. In addition, the video style templates may be associated with the movie theme. The video style templates may provide the previewed image with an adjusted tone that is similar to or the same as atone in a movie, creating an atmosphere for the user in which a movie is shot.

In addition, after the electronic device 100 enables the LUT function, the electronic device 100 may determine one video style template among a plurality of video style templates based on a currently previewed video image. The determined video style template may be displayed in an interface, so that the user may understand the currently determined video style template. For example, the plurality of video style templates include a style template of a movie "A", a style template of a movie "B", and a style template of a movie "C". LUTs corresponding to different style templates of movies may be generated in advance based on corresponding color matching styles of movies. Color conversion of the LUT has a style characteristic corresponding to a movie. A LUT appropriate for a mobile electronic device may be generated by pre-extraction from the movie style. Enabling the LUT function changes a tone of the previewed video image. As illustrated in FIG. 5, the electronic device 100 determines and displays the style template of the movie "A".

In some embodiments, the electronic device 100 may select a video style template based on a sliding operation of a user. Specifically, after the electronic device 100 detects a user operation of the user to enable the LUT function and displays a LUT preview window, the electronic device 100 may select a first video style template in the LUT preview window by default as a video style template selected by the electronic device 100. Then the electronic device 100 may detect a left-right sliding operation of the user acting on the LUT preview window and move a position of each video style template in the LUT preview window. When the electronic device 100 no longer detects the sliding operation of the user, the electronic device 100 uses the first video style template displayed in the LUT preview window as the video style template selected by the electronic device 100.

In some embodiments, in addition to changing a display effect of a previewed image by using a video style template, the electronic device 100 may detect a user operation of starting to record a video after the video style template is added. In response to the operation, the electronic device 100 starts to record a video, to obtain a video with a display effect adjusted by using the video style template. In addition, during video recording, the electronic device 100 may also detect a user operation of shooting a photo. In response to the operation, the electronic device 100 stores, as a picture, a previewed image to which a video style template is added in the preview box, to obtain an image with a display effect adjusted by using the video style template.

The electronic device may enable the HDR10 function. In the HDR10 mode, HDR is a high-dynamic range (High-Dynamic Range, HDR). Compared with a normal image, HDR can provide more dynamic ranges and image details, and can better reflect a visual effect in a real environment. 10 in HDR10 is 10 bits, and HDR10 can record a video in a high dynamic range of 10 bits.

Figure 12:
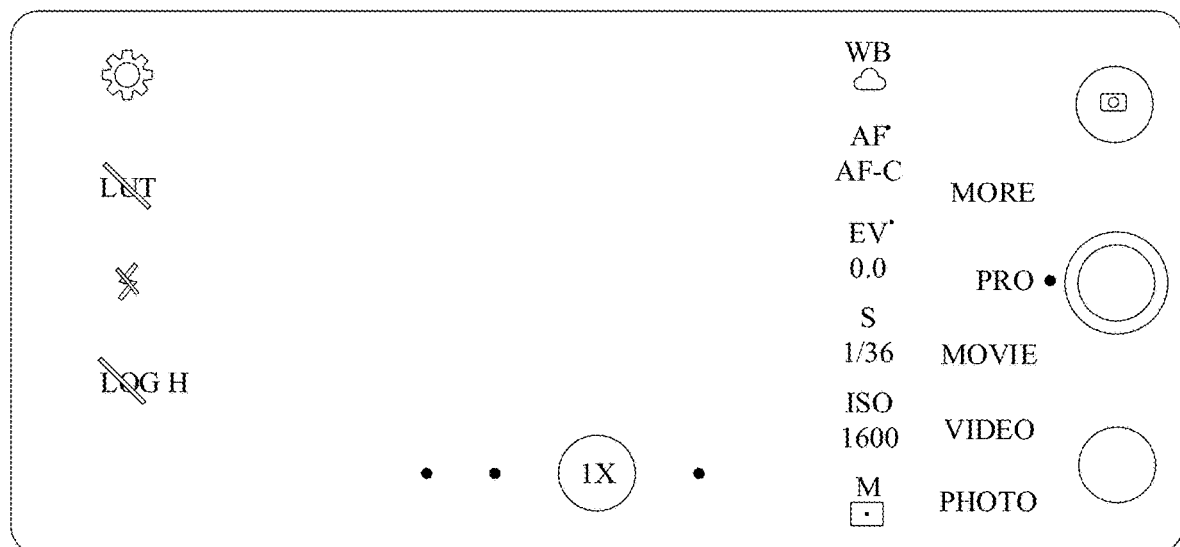
FIG. 12 is a schematic diagram of a user interface in a professional mode according to an embodiment of this application.

The electronic device 100 may detect a touch operation of the user acting on the professional mode option, to display the professional mode. As shown in FIG. 12, when the electronic device is in the professional mode, functional options that may be included in a user interface are, for example, a LOG option, a flash option, a LUT option, and a setting option. In addition, the user interface further includes a parameter adjustment option, for example, a photometric M option, an ISO option, a shutter S option, an exposure value EV option, a focusing manner AF option, and a white balance WB option.

In some embodiments, the electronic device 100 may start the professional mode by default after the camera application is started. This application is not limited thereto. The electronic device 100 may alternatively start the professional mode in another manner. For example, the electronic device 100 may alternatively start the professional mode based on a voice instruction of a user, which is not limited in this embodiment of this application.

The electronic device 100 may detect a user operation of the user acting on the LOG option. In response to the operation, the electronic device 100 enables the LOG function. The LOG function can apply a logarithm function to an exposure curve, to keep details of a highlight and shadow of an image captured by a camera lens to the maximum extent, so that a finally presented previewed image has a low saturation. A video recorded by using the LOG function is referred to as a LOG video.

In the professional mode, the electronic device 100 may record a video to which a video style template is added, may alternatively add a video style template to a video to which no video style template is added, or record a LOG video after enabling the LOG function, and then add a video style template to the LOG video. In this way, the electronic device 100 may not only adjust a display effect of an image before recording a video, but also adjust a display effect of a recorded video after completing video recording, increasing flexibility and freedom of image adjustment.

An embodiment of this application further provides a video processing apparatus. The video processing apparatus includes: a video obtaining module, configured to obtain, in a first night mode or a second night mode, a video shot through a camera lens, where the video includes a video image of a first exposure frame and a video image of a second exposure frame that are alternated, and a time for which the video image of a first exposure frame is exposed is greater than a time for which the video image of a second exposure frame is exposed; an AI night algorithm module, configured to process, in the first night mode, the video image of a first exposure frame by using an artificial intelligence AI night algorithm, where processing by using the AI night algorithm is used for reducing noise and increasing a luminance; and a fusion module, configured to: fuse a video image of a first exposure frame processed by using the AI night algorithm and the video image of a second exposure frame not processed by using the AI night algorithm in the first night mode, to obtain a fused video, where the video image of a first exposure frame has a first weight; and fuse the video image of a first exposure frame and the video image of a second exposure frame in the second night mode, to obtain a fused video, where the video image of a first exposure frame has a second weight, and the first weight is greater than the second weight.

It should be understood that division of the video processing apparatus into modules is merely logical function division. The modules may be all or partially integrated into a physical entity or may be physically separated in actual implementation. In addition, all of the modules may be implemented in a form of software invoked by using a processing element or may be implemented in a form of hardware. Alternatively, some modules may be implemented in a form of software invoked by using the processing element, and some modules are implemented in a form of hardware. For example, any one of the video obtaining module, the AI night algorithm module, and the fusion module may be a separate processing element or may be integrated into a video processing apparatus, for example, may be integrated into a chip in the video processing apparatus for implementation. In addition, any one of the video obtaining module, the AI night algorithm module, and the fusion module may be alternatively stored in a memory of the video processing apparatus in a form of a program, and functions of the modules may be invoked and executed by a processing element of the video processing apparatus. Implementations of other modules are similar thereto. In addition, all or some of these modules may be integrated or implemented independently. The processing element herein may be an integrated circuit having a signal processing capability. During implementation, steps of the foregoing method or the foregoing modules may be completed through an integrated logic circuit of the hardware in the processor element or an instruction in the form of software.

For example, the modules including the video obtaining module, the AI night algorithm module, and the fusion module may be one or more integrated circuits configured to implement the foregoing method, such as one or more application-specific integrated circuits (Application-Specific Integrated Circuit, ASIC), one or more microprocessors (digital signal processor, DSP), or one or more field programmable gate arrays (Field Programmable Gate Array, FPGA). For another example, when one of the foregoing modules is implemented in a form of a program invoked by the processing component, the processing component may be a general processor, for example, a central processing unit (Central Processing Unit, CPU) or another processor that may invoke the program. For another example, the modules may be integrated in a form of a system-on-a-chip (system-on-a-chip, SOC) for implementation.

An embodiment of this application further provides a video processing apparatus. The video processing apparatus includes: a processor and a memory. The memory is configured to store at least one instruction. The instruction is loaded and executed by the processor to implement the video processing method in any one of the foregoing embodiments.

The foregoing video processing method may be applied to the video processing apparatus. A specific process and principle are not described herein again.

A quantity of processors may be one or more. The processor and memory may be connected via a bus in another manner. The memory, as a non-transitory computer-readable storage medium, may be configured to store a non-transitory software program, a non-transitory computerexecutable program, and a module, such as program instructions/module corresponding to the video processing apparatus in this embodiment of this application. The processor runs the non-transitory software program, instructions, and the module that are stored in the memory, to execute various functional applications and data processing, that is, implement a method in any one of the foregoing method embodiments. The memory may include a program storage area and a data storage area. The program storage area may store an operating system, an application required for at least one function, necessary data, and the like. In addition, the memory may include a high speed random access memory, and may also include a non-transient memory, such as at least one magnetic disk storage device, a flash memory, or another non-transient solid state storage device.

As shown in FIG. 1, an embodiment of this application further provides an electronic device. The electronic device includes a camera lens 193 and the foregoing video processing apparatus. The video processing apparatus includes a processor 110.

A specific principle and a working process of the video processing apparatus are the same as a specific principle and working process in the foregoing embodiments. The details are not described herein again. The electronic device may be any product or component having a video shooting function, such as a mobile phone, a television, a tablet computer, a watch, a wristband, or the like.

An embodiment of this application further provides a computer-readable storage medium. The computer-readable storage medium stores a computer program. When the computer program is run on a computer, the computer is enabled to perform the video processing method in any one of the foregoing embodiments.

In the foregoing embodiments, all or some of the foregoing embodiments may be implemented by using software, hardware, firmware, or any combination thereof. When the software is used for implementing the embodiments, all or a part of the embodiments may be implemented in a form of a computer program product. The computer program product includes one or more computer instructions. When instructions of the computer program are loaded and executed on a computer, procedures or functions according to this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk)), or the like.

In embodiments of this application, "at least one" means one or more, and "a plurality" means two or more. "and/or" describes an association relationship for describing associated objects and represents that three relationships may exist. For example, A and/or B may represent the following three cases: Only A exists, both A and B exist, and only B exists. A or B may be singular or plural. The character "/" generally indicates an "or" relationship between associated objects before and after the character. "at least one of the following" or a similar expression thereof means any combination of these items, including a single item or any combination of a plurality of items. For example, at least one of a, b, and c may represent a, b, c, a and b, a and c, b and c, or a, b, and c. a, b, and c may be single or multiple.

The foregoing descriptions are merely exemplary embodiments of this application, but are not intended to limit this application. Persons skilled in the art understand that this application may have various modifications and variations. Any modification, equivalent replacement, and improvement made without departing from the spirit and principle of this application shall fall within the protection scope of this application.

What is claimed is:

1. A video processing method, comprising:
   in a first night mode or a second night mode, obtaining a video shot through a camera lens, wherein the video comprises a video image of a first exposure frame and a video image of a second exposure frame that are alternated, and a time for which the video image of a first exposure frame is exposed is greater than a time for which the video image of a second exposure frame is exposed;
   in the first night mode, processing the video image of a first exposure frame by using an artificial intelligence AI night algorithm, wherein processing by using the AI night algorithm is used for reducing noise and increasing a luminance;
   in the first night mode, fusing a video image of a first exposure frame processed by using the AI night algorithm and the video image of a second exposure frame not processed by using the AI night algorithm, to obtain a fused video, wherein the video image of a first exposure frame has a first weight; and
   in the second night mode, fusing the video image of a first exposure frame and the video image of a second exposure frame, to obtain a fused video, wherein the video image of a first exposure frame has a second weight, and the first weight is greater than the second weight.

2. The video processing method according to claim 1, further comprising:
   in the first night mode, processing the fused video by using a logarithm LOG curve corresponding to a current photosensitivity ISO of the camera lens, to obtain a LOG video; and
   processing the LOG video based on a look up table (LUT), to obtain a video processed by using the LUT.

3. The video processing method according to claim 1, wherein:
   the processing the video image of a first exposure frame by using an AI night algorithm comprises:
   obtaining statistical information corresponding to the video image of a first exposure frame; and
   processing the statistical information and a RAW image of the video image of a first exposure frame as inputs to be processed by using the AI night algorithm, to obtain a processed RAW image of the video image of a first exposure frame.

4. The video processing method according to claim 1, further comprises:
   periodically obtaining a luminance of a current image in a video shot through the camera lens, and if the luminance is less than a first luminance threshold, displaying the first night mode, or if the luminance is greater than a second luminance threshold, displaying the second night mode, wherein the first luminance threshold is less than the second luminance threshold.

5. The video processing method according to claim 4, wherein
in the first night mode, the video is obtained in a manner of non-overlapping exposure; and
in the second night mode, the video is obtained in a manner of overlapping exposure.

6. The video processing method according to claim 2, wherein
a process of processing the fused video by using a logarithm LOG curve corresponding to a current photosensitivity ISO of the camera lens, to obtain a LOG video, and a process of processing the LOG video based on a look up table LUT, to obtain a video processed by using the LUT are performed in a first video processing procedure;
the video processing method further comprises a second video processing procedure, and the second video processing procedure comprises:
processing the fused video by using the logarithm LOG curve corresponding to the current photosensitivity ISO of the camera lens, to obtain a LOG video; and
processing the LOG video based on the look up table LUT, to obtain a video processed by using the LUT; and
the video processing method further comprises:
storing the video processed by using the LUT in the first video processing procedure; and
previewing the video processed by using the LUT in the second video processing procedure.

7. An electronic device, comprising:
a camera lens, a processor and a memory, wherein the memory is configured to store at least one instruction, and when the instruction is loaded and executed by the processor, the video processing method comprises:
in a first night mode or a second night mode, obtaining a video shot through a camera lens, wherein the video comprises a video image of a first exposure frame and a video image of a second exposure frame that are alternated, and a time for which the video image of a first exposure frame is exposed is greater than a time for which the video image of a second exposure frame is exposed;
in the first night mode, processing the video image of a first exposure frame by using an artificial intelligence AI night algorithm, wherein processing by using the AI night algorithm is used for reducing noise and increasing a luminance;
in the first night mode, fusing a video image of a first exposure frame processed by using the AI night algorithm and the video image of a second exposure frame not processed by using the AI night algorithm, to obtain a fused video, wherein the video image of a first exposure frame has a first weight; and
in the second night mode, fusing the video image of a first exposure frame and the video image of a second exposure frame, to obtain a fused video, wherein the video image of a first exposure frame has a second weight, and the first weight is greater than the second weight.

8. A non-transitory computer-readable storage medium storing a computer program, which when the computer program is run on a computer, the computer is enabled to perform a video processing method, the method comprising:
in a first night mode or a second night mode, obtaining a video shot through a camera lens, wherein the video comprises a video image of a first exposure frame and a video image of a second exposure frame that are alternated, and a time for which the video image of a first exposure frame is exposed is greater than a time for which the video image of a second exposure frame is exposed;
in the first night mode, processing the video image of a first exposure frame by using an artificial intelligence AI night algorithm, wherein processing by using the AI night algorithm is used for reducing noise and increasing a luminance;
in the first night mode, fusing a video image of a first exposure frame processed by using the AI night algorithm and the video image of a second exposure frame not processed by using the AI night algorithm, to obtain a fused video, wherein the video image of a first exposure frame has a first weight; and
in the second night mode, fusing the video image of a first exposure frame and the video image of a second exposure frame, to obtain a fused video, wherein the video image of a first exposure frame has a second weight, and the first weight is greater than the second weight.

9. The electronic device according to claim 7, further comprising:
in the first night mode, processing the fused video by using a logarithm LOG curve corresponding to a current photosensitivity ISO of the camera lens, to obtain a LOG video; and
processing the LOG video based on a look up table (LUT), to obtain a video processed by using the LUT.

10. The electronic device according to claim 7, wherein:
the processing the video image of a first exposure frame by using an AI night algorithm comprises:
obtaining statistical information corresponding to the video image of a first exposure frame; and
processing the statistical information and a RAW image of the video image of a first exposure frame as inputs to be processed by using the AI night algorithm, to obtain a processed RAW image of the video image of a first exposure frame.

11. The electronic device according to claim 7, further comprises:
periodically obtaining a luminance of a current image in a video shot through the camera lens, and if the luminance is less than a first luminance threshold, displaying the first night mode, or if the luminance is greater than a second luminance threshold, displaying the second night mode, wherein the first luminance threshold is less than the second luminance threshold.

12. The electronic device according to claim 11, wherein
in the first night mode, the video is obtained in a manner of non-overlapping exposure; and
in the second night mode, the video is obtained in a manner of overlapping exposure.

13. The electronic device according to claim 9, wherein a process of processing the fused video by using a logarithm LOG curve corresponding to a current photosensitivity ISO of the camera lens, to obtain a LOG video, and a process of processing the LOG video based on a look up table LUT, to obtain a video processed by using the LUT are performed in a first video processing procedure;
the video processing method further comprises a second video processing procedure, and the second video processing procedure comprises:

processing the fused video by using the logarithm LOG curve corresponding to the current photosensitivity ISO of the camera lens, to obtain a LOG video; and processing the LOG video based on the look up table LUT, to obtain a video processed by using the LUT; and the video processing method further comprises:

storing the video processed by using the LUT in the first video processing procedure; and previewing the video processed by using the LUT in the second video processing procedure.

14. The computer-readable storage medium according to claim 8, wherein the method further comprises:

in the first night mode, processing the fused video by using a logarithm LOG curve corresponding to a current photosensitivity ISO of the camera lens, to obtain a LOG video; and processing the LOG video based on a look up table (LUT), to obtain a video processed by using the LUT.

15. The computer-readable storage medium according to claim 8, wherein:

the processing the video image of a first exposure frame by using an AI night algorithm comprises:

obtaining statistical information corresponding to the video image of a first exposure frame; and processing the statistical information and a RAW image of the video image of a first exposure frame as inputs to be processed by using the AI night algorithm, to obtain a processed RAW image of the video image of a first exposure frame.

16. The computer-readable storage medium according to claim 8, wherein the method further comprises:

periodically obtaining a luminance of a current image in a video shot through the camera lens, and if the luminance is less than a first luminance threshold, displaying the first night mode, or if the luminance is greater than a second luminance threshold, displaying the second night mode, wherein the first luminance threshold is less than the second luminance threshold.

17. The computer-readable storage medium according to claim 16, wherein in the first night mode, the video is obtained in a manner of non-overlapping exposure; and in the second night mode, the video is obtained in a manner of overlapping exposure.

18. The computer-readable storage medium according to claim 14, wherein a process of processing the fused video by using a logarithm LOG curve corresponding to a current photosensitivity ISO of the camera lens, to obtain a LOG video, and a process of processing the LOG video based on a look up table LUT, to obtain a video processed by using the LUT are performed in a first video processing procedure;

the video processing method further comprises a second video processing procedure, and the second video processing procedure comprises:

processing the fused video by using the logarithm LOG curve corresponding to the current photosensitivity ISO of the camera lens, to obtain a LOG video; and processing the LOG video based on the look up table LUT, to obtain a video processed by using the LUT; and the video processing method further comprises:

storing the video processed by using the LUT in the first video processing procedure; and previewing the video processed by using the LUT in the second video processing procedure.

* * * * *